United States Patent
Otomo

(10) Patent No.: US 11,957,977 B2
(45) Date of Patent: Apr. 16, 2024

(54) VIDEO GAME FUSION CONTENT

(71) Applicant: KABUSHIKI KAISHA SEGA GAMES, Tokyo (JP)

(72) Inventor: Takahiro Otomo, Tokyo (JP)

(73) Assignee: KABUSHIKI KAISHA SEGA GAMES, Tokyo (JP)

( * ) Notice: Subject to any disclaimer, the term of this patent is extended or adjusted under 35 U.S.C. 154(b) by 0 days.

(21) Appl. No.: 17/878,755

(22) Filed: Aug. 1, 2022

(65) Prior Publication Data

US 2022/0362670 A1   Nov. 17, 2022

Related U.S. Application Data

(62) Division of application No. 16/755,422, filed as application No. PCT/JP2018/034231 on Sep. 14, 2018, now Pat. No. 11,439,905.

(30) Foreign Application Priority Data

Oct. 12, 2017   (JP) .................................. 2017-198145

(51) Int. Cl.
   *A63F 13/69*   (2014.01)
   *A63F 13/30*   (2014.01)
   (Continued)

(52) U.S. Cl.
   CPC .......... *A63F 13/5375* (2014.09); *A63F 13/30* (2014.09); *A63F 13/69* (2014.09); *A63F 13/79* (2014.09); *A63F 13/825* (2014.09)

(58) Field of Classification Search
   None
   See application file for complete search history.

(56) References Cited

U.S. PATENT DOCUMENTS

2009/0253494 A1   10/2009   Fitch et al.
2014/0004958 A1   1/2014   Kishimoto et al.
(Continued)

FOREIGN PATENT DOCUMENTS

JP   2014004164 A   1/2014
JP   2014128332 A   7/2014
(Continued)

OTHER PUBLICATIONS

Office Action in U.S. Appl. No. 17/878,739 dated Jul. 28, 2023, 12 pages.
(Continued)

*Primary Examiner* — Damon J Pierce
(74) *Attorney, Agent, or Firm* — Rothwell, Figg, Ernst & Manbeck, P.C.

(57) ABSTRACT

It is an object of the present invention to allow reserved content to be used at the proper timing. The information processing device of the present invention comprises a trade information storage unit that stores trade information for each user in which trade-away content and trade-for content set in association with each other; a user information storage unit that stores user information in which a user's possessed content and reserved content are set; a selection unit that selects reserved content that is the same as the designated trade-for content and is not the same as the possessed content, from among the user's reserved content based on the user information, as a result of an operation performed by the user to designate trade-for content that the user wants to acquire in a trade; and a notification unit that notifies the user that the selected reserved content can be acquired without a trade.

2 Claims, 13 Drawing Sheets

(51) Int. Cl.
      *A63F 13/5375*    (2014.01)
      *A63F 13/79*    (2014.01)
      *A63F 13/825*    (2014.01)

(56) References Cited

U.S. PATENT DOCUMENTS

| | | | |
|---|---|---|---|
| 2014/0128164 A1* | 5/2014 | Ukai | A63F 13/35 463/42 |
| 2014/0315646 A1 | 10/2014 | Mizuno | |
| 2015/0157942 A1 | 6/2015 | Ikeda | |
| 2017/0182417 A1 | 6/2017 | Kogure | |

FOREIGN PATENT DOCUMENTS

| | | | |
|---|---|---|---|
| JP | 2016140748 A | 8/2016 |
| JP | 6075495 B1 | 2/2017 |
| JP | 2017202045 A | 11/2017 |

OTHER PUBLICATIONS

Non-Final Office Action mailed Dec. 5, 2023 in corresponding U.S. Appl. No. 17/878,739, First Named Inventor: Takahiro Otomo (13 pages).

\* cited by examiner

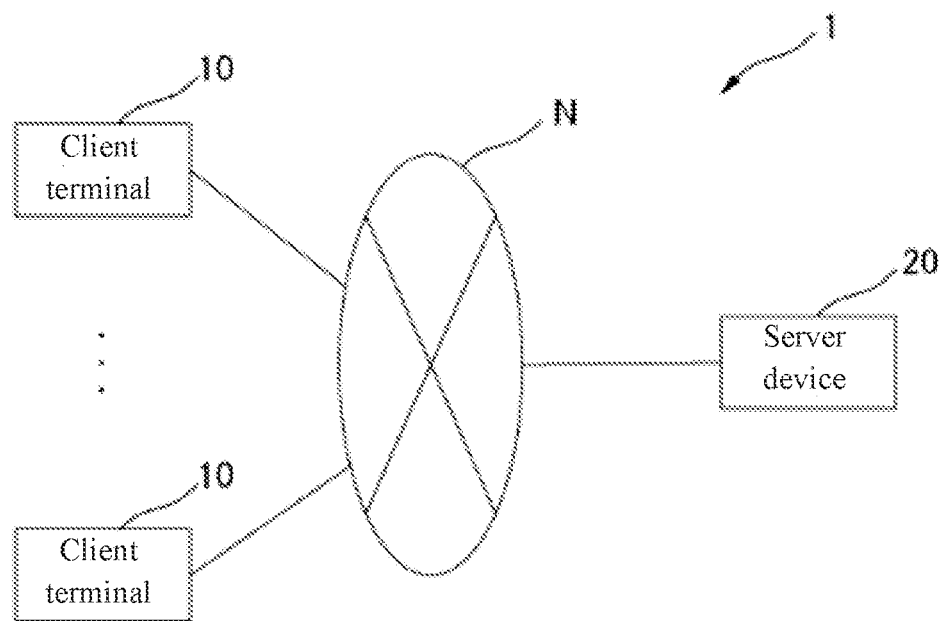
[FIG. 1]
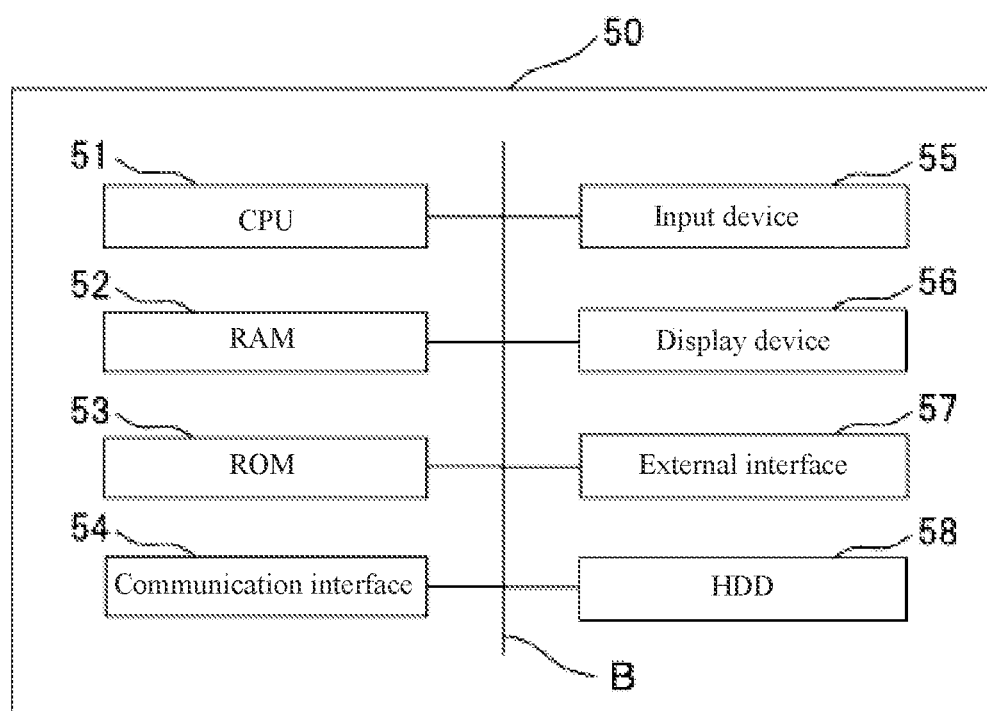
[FIG. 2]

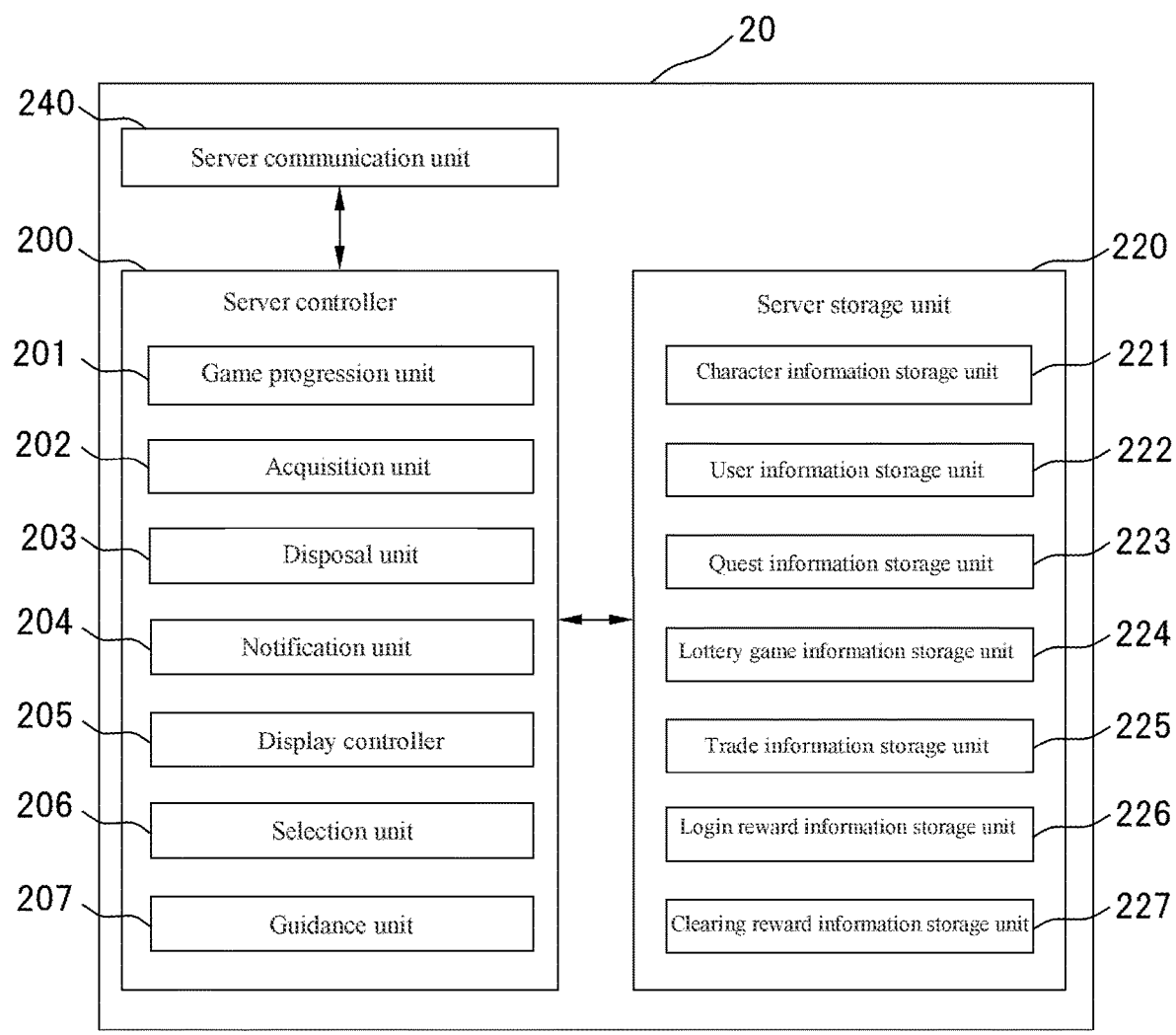
[FIG. 3]

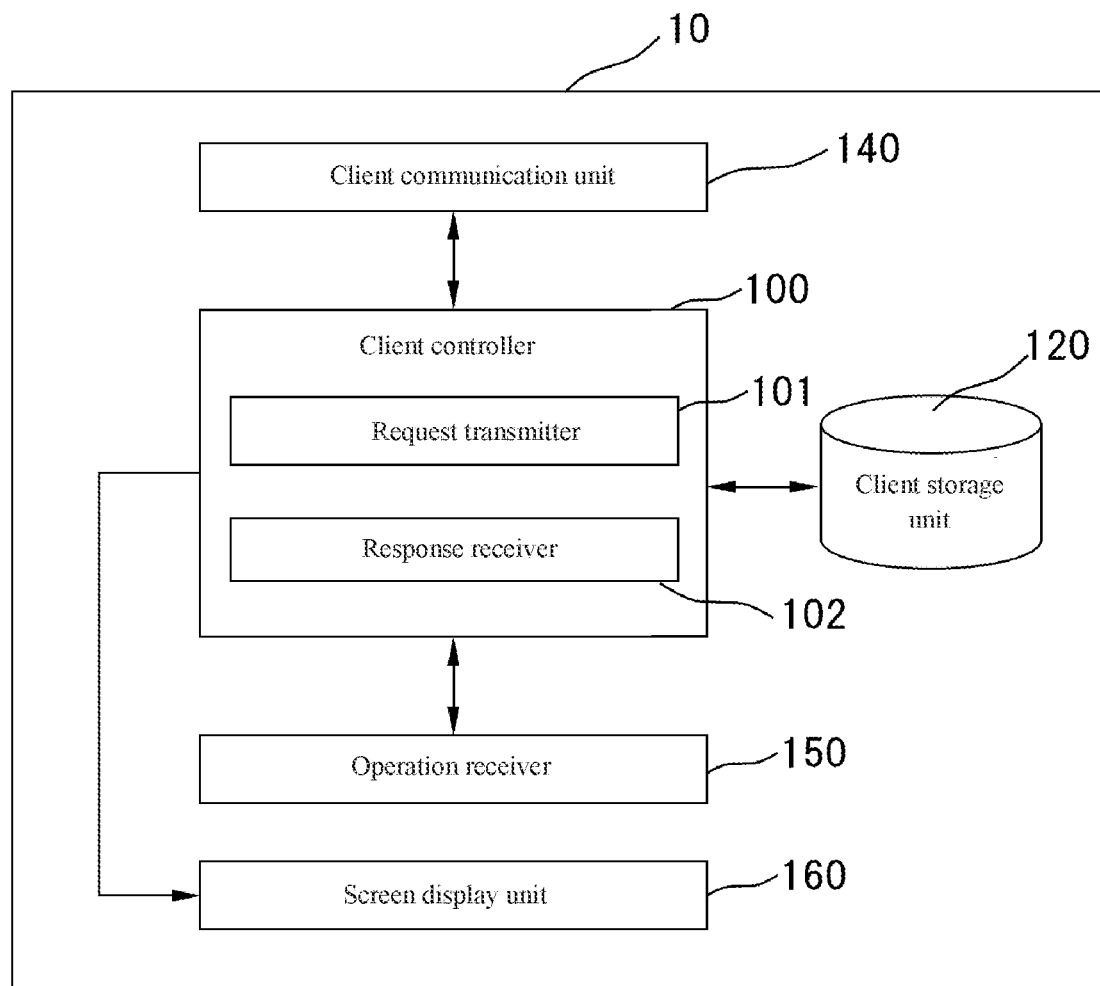
[FIG. 4]

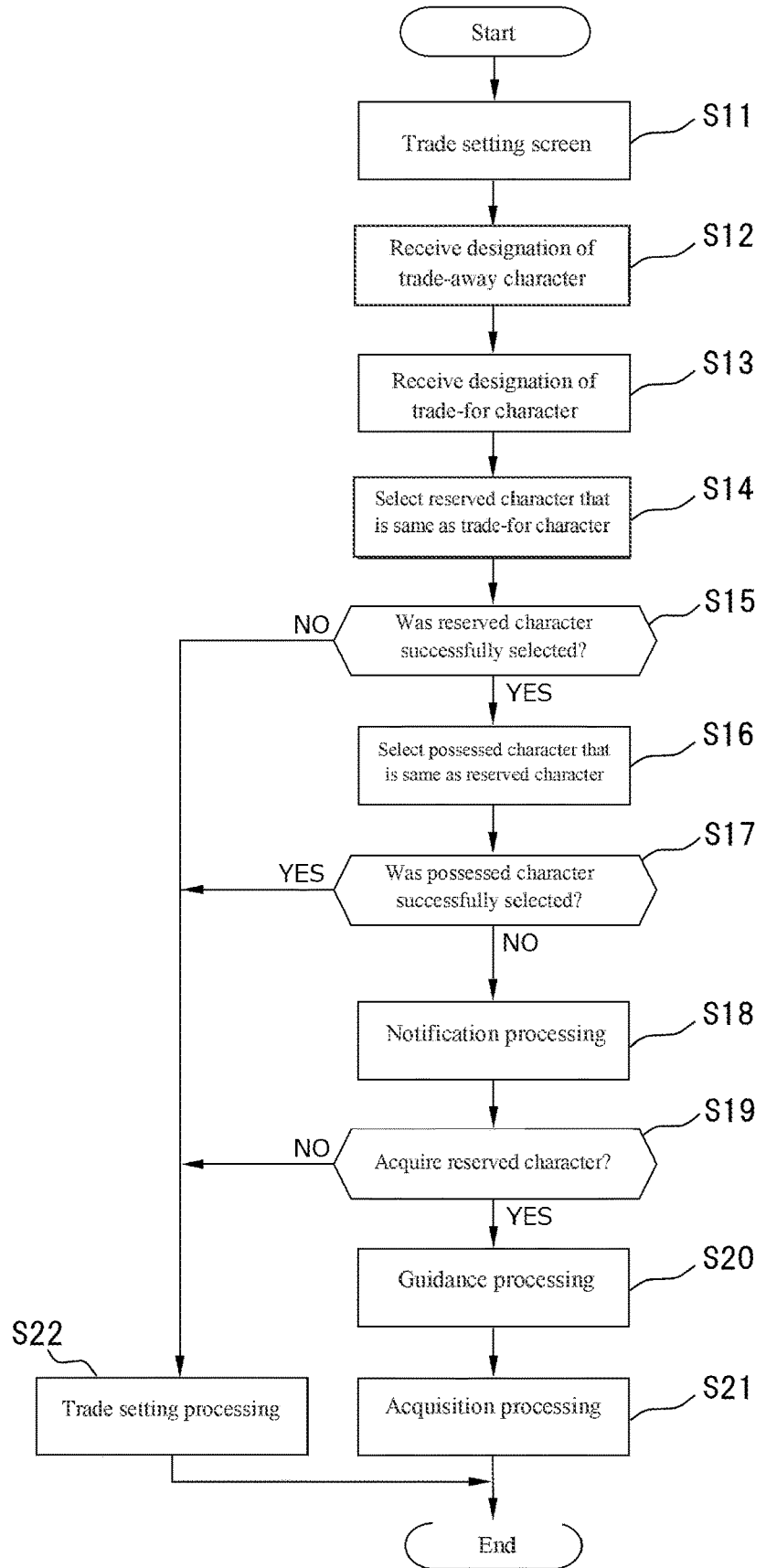
[FIG. 5]

[FIG. 6]

| User ID | Name | Rank | Possessed characters | Possessed number / upper limit number | Reserved characters | Possessed points | Possessed coins | Party | Received email information | Trade setting information | ... |
|---|---|---|---|---|---|---|---|---|---|---|---|
| 0001 | User A | 59 | c0051(1), ... | 90/100 | c0042(1), ... | 100 | 150 | c0051, ... | Received email 1 | Trade setting information c001 | ... |
| 0002 | User B | 25 | c0005(1), ... | 55/55 | c0153(1), ... | 25 | 50 | c0005, ... | Received email 1 | Trade setting information c002 | ... |
| 0003 | User C | 7 | c0099(1), ... | 40/50 | c0063(1), ... | 5 | 3 | c0099, ... | Received email 1 | Trade setting information c003 | ... |
| ... | | | | | | | | | | | |

[FIG. 7]

| Character ID | Name | Rarity | Ability parameters | Number of coins | Evolved characters | Resource characters |
|---|---|---|---|---|---|---|
| c0001 | Character A | 1 | Attack 10, Defense 10, HP10 | 50 | c101 | c011 |
| | | | | | | c012 |
| c0002 | Character B | 2 | Attack 15, Defense 15, HP15 | 100 | c102 | c002 |
| | | | | | | c006 |
| | | | | | | c007 |
| c0003 | Character C | 3 | Attack 20, Defense 20, HP20 | 150 | - | - |
| ... | | | | | | |

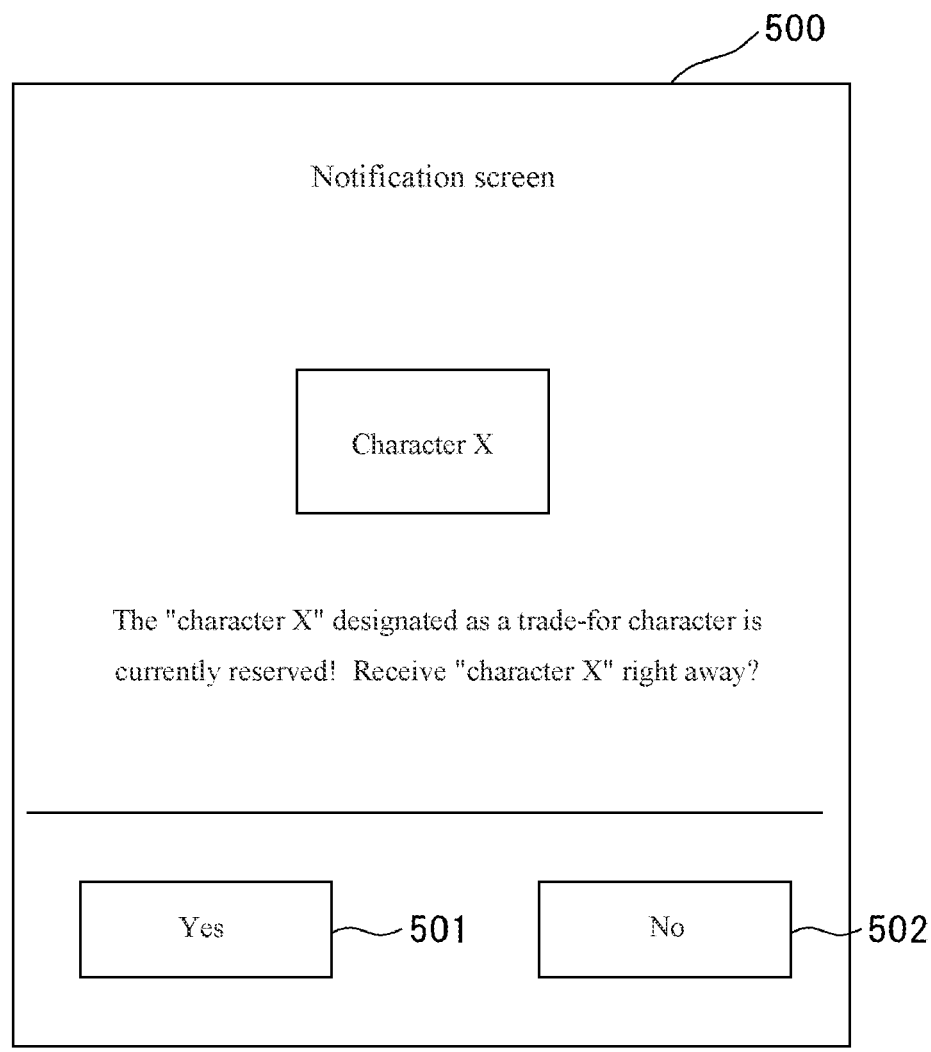
[FIG. 8]

| Trade setting information t001 | | | |
|---|---|---|---|
| Setting frame | Trade-away characters | Trade-for characters | ... |
| Frame #1 | c0002 | c0015 | ... |
| Frame #2 | c0125 | c0362 | ... |
| Frame #3 | - | - | ... |
| ... | ... | ... | ... |

[FIG. 9]

| Trade ID | Inviting user | Trade-away character | Trade-for character | Trade permitted period | ... |
|---|---|---|---|---|---|
| t0001 | User K | c0051 | c0051 | 8/1 to 8/8/2017 | ... |
| t0002 | User S | c0953 | c0953 | 8/3 to 8/10/2017 | ... |
| t0003 | User Y | c0006 | c0006 | 8/5 to 8/12/2017 | ... |
| ... | ... | ... | ... | ... | ... |

[FIG. 10]

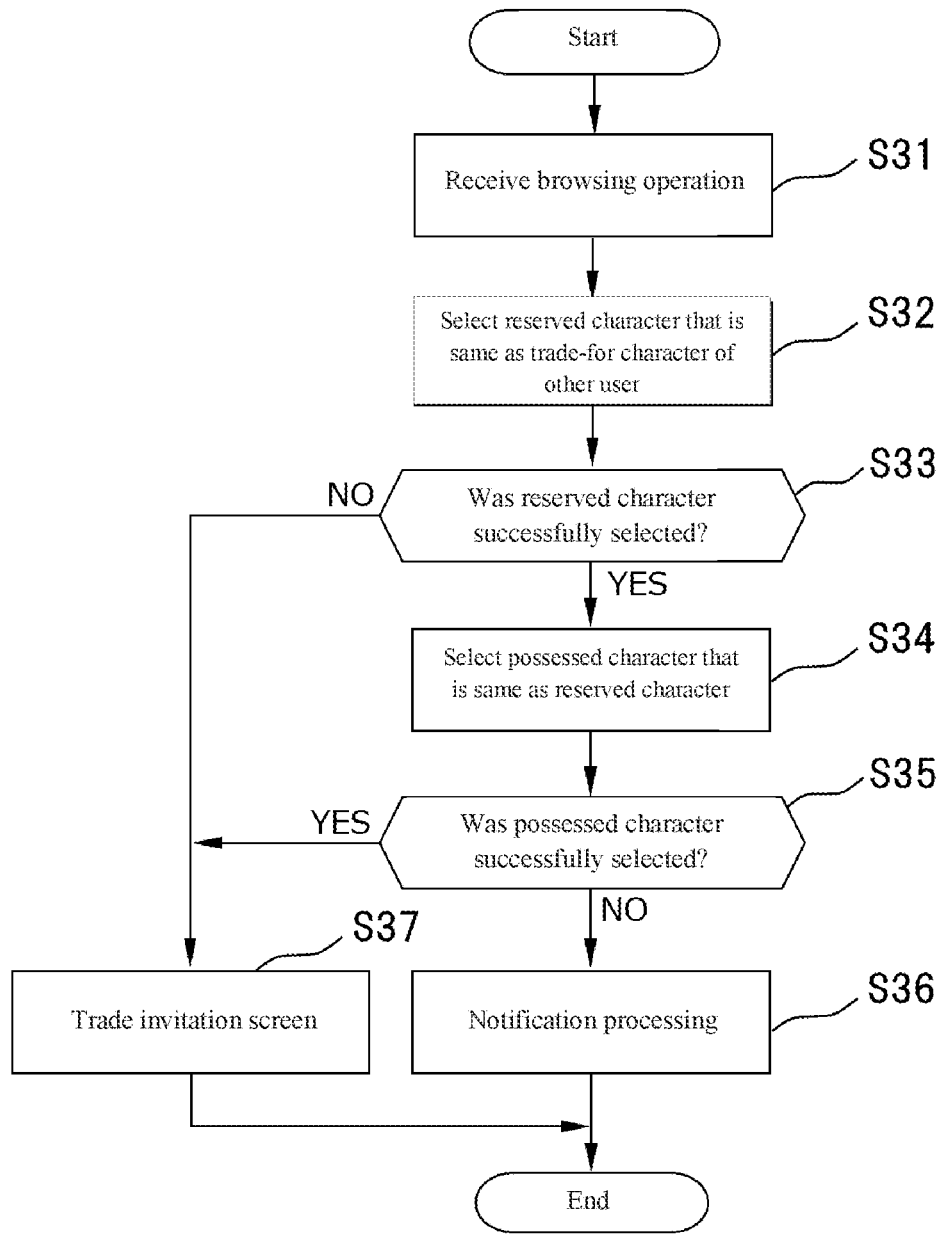
[FIG. 11]

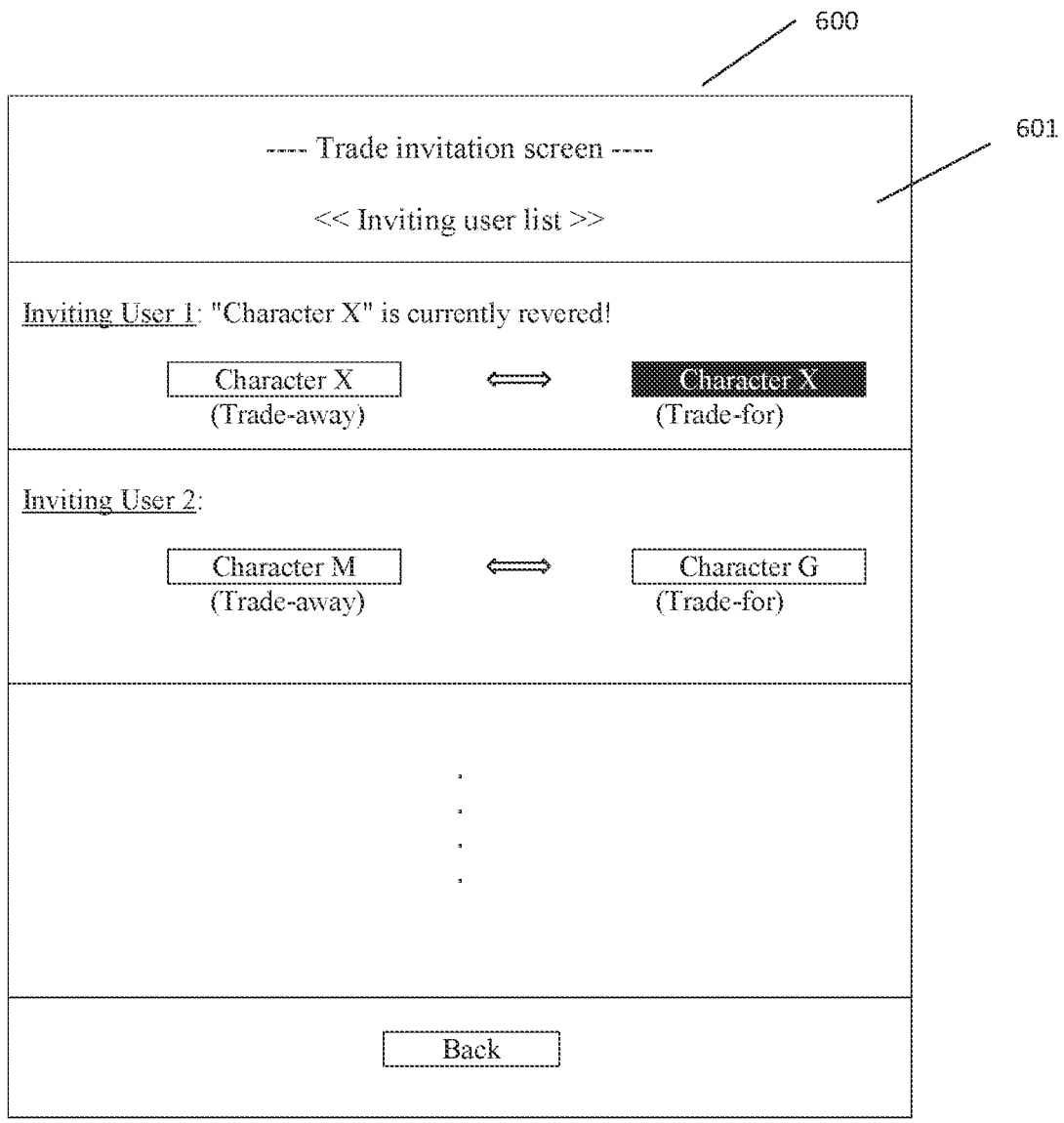
[FIG. 12]

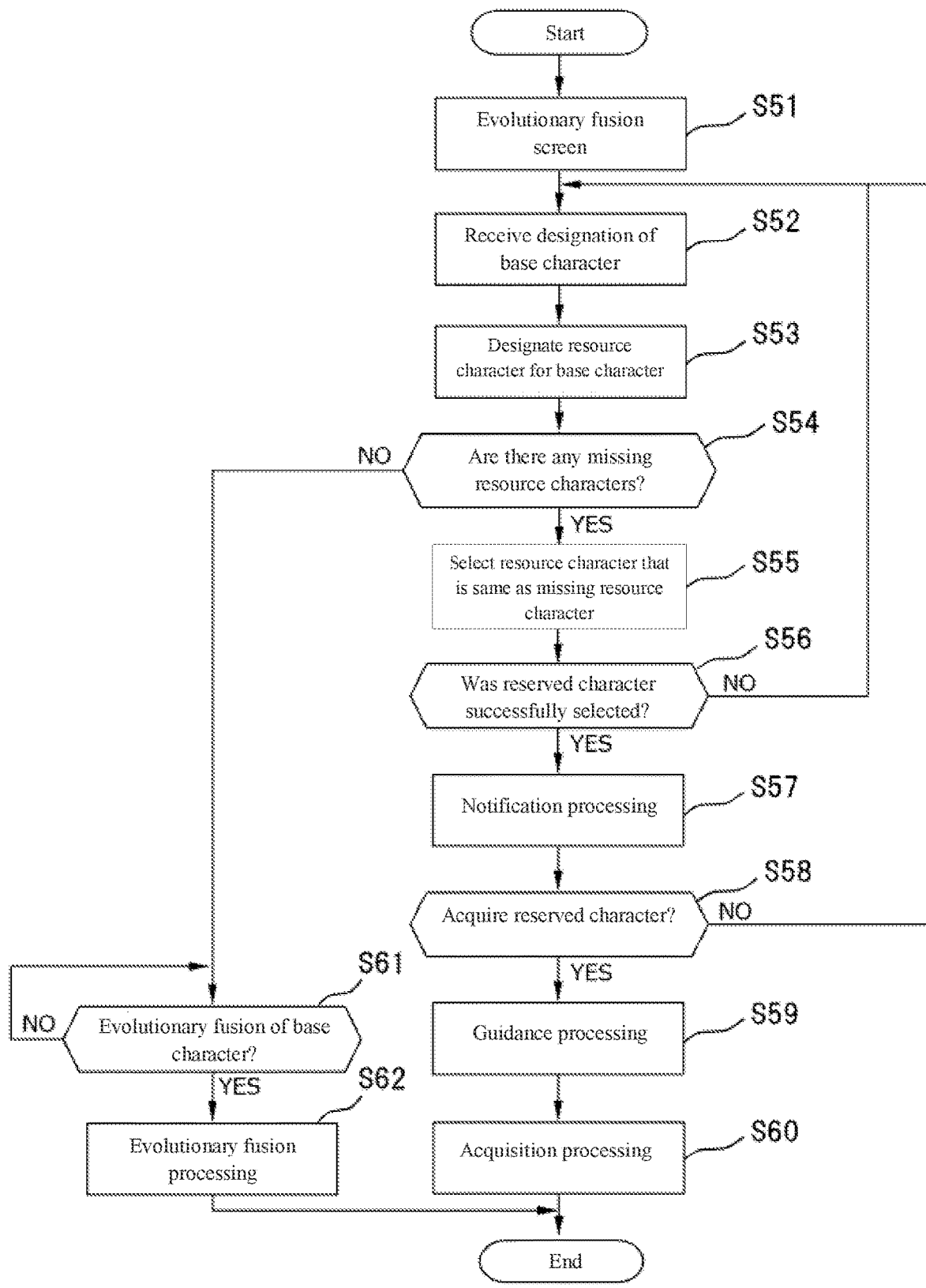
[FIG. 13]

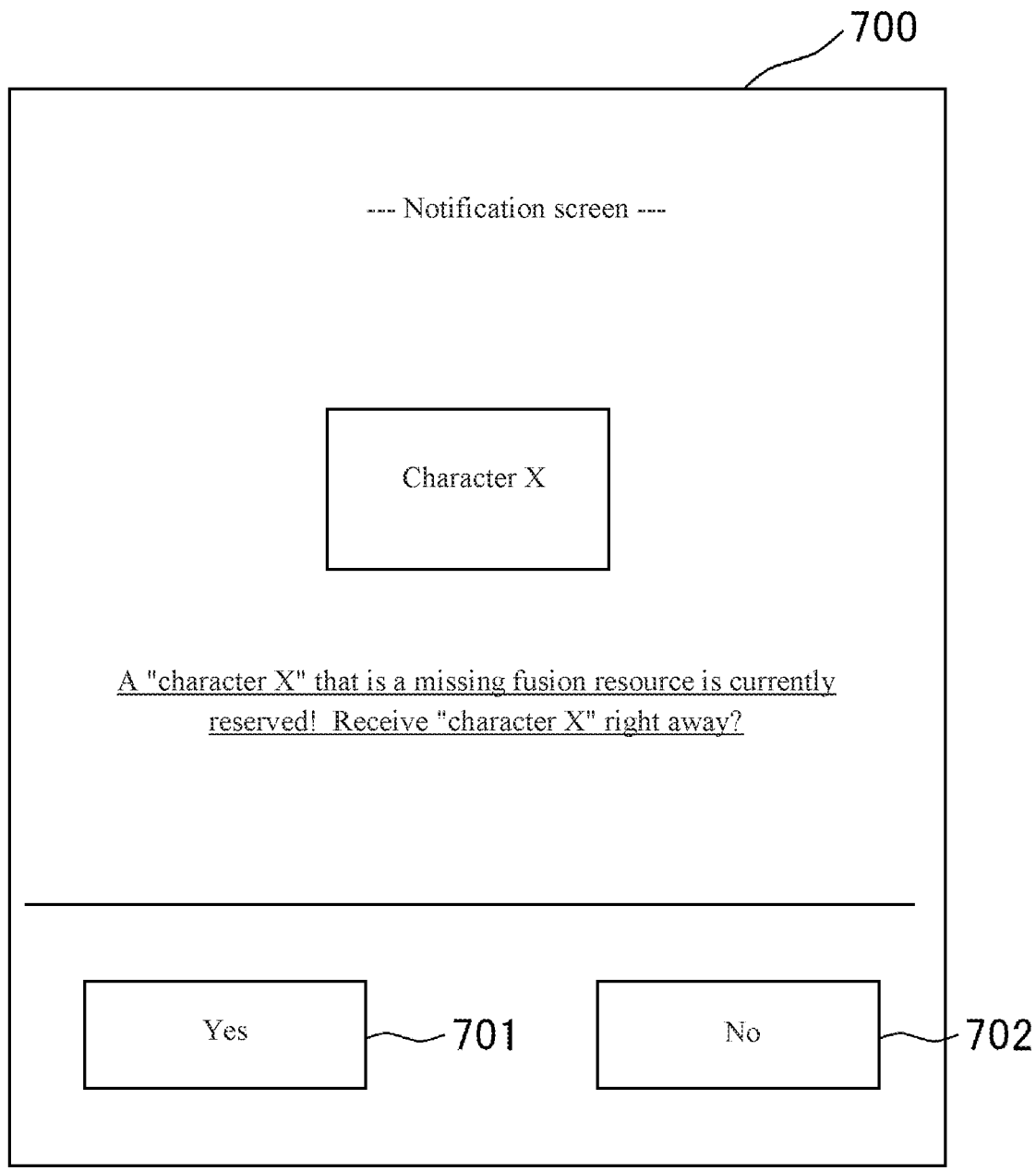
[FIG. 14]

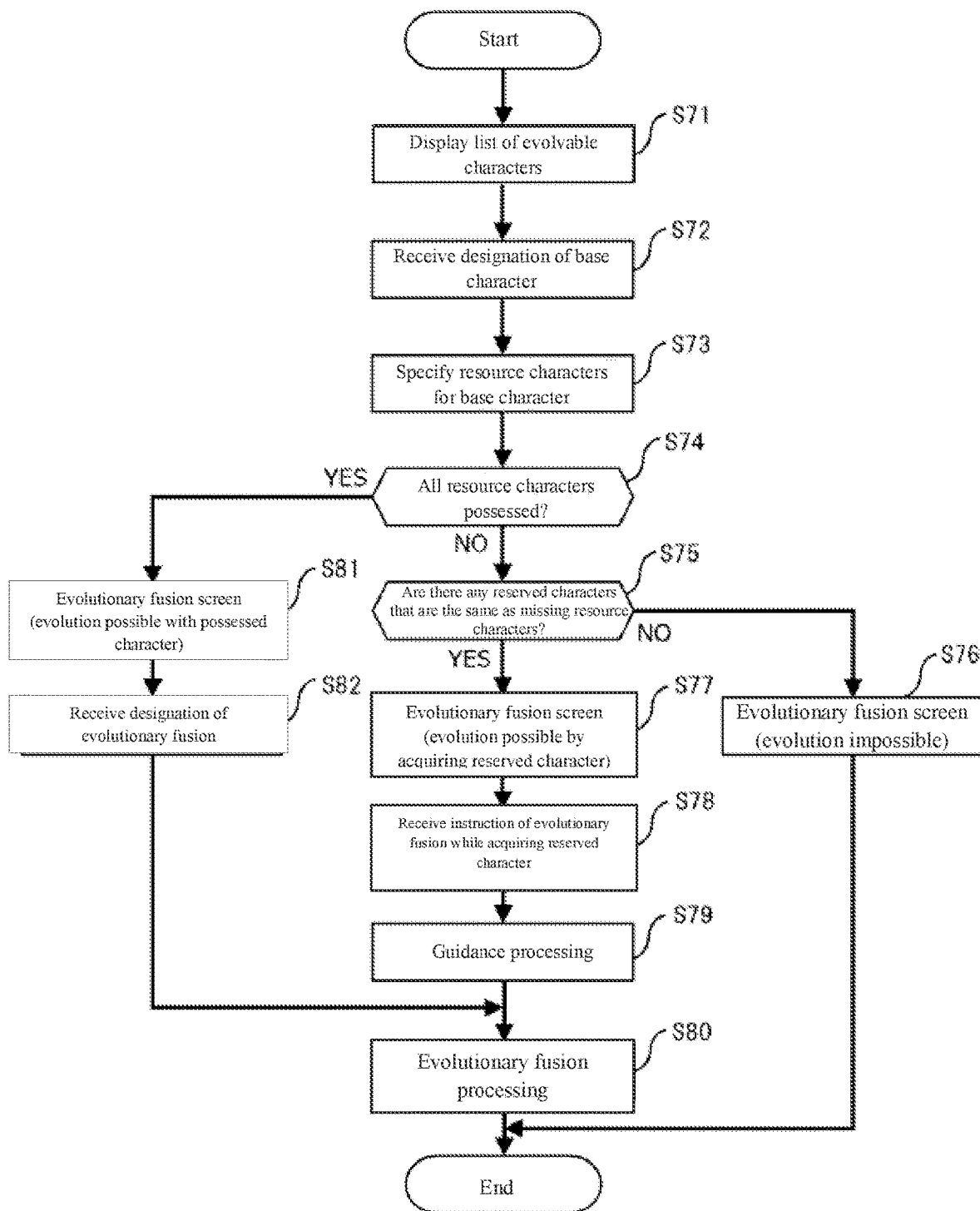
[FIG. 15]

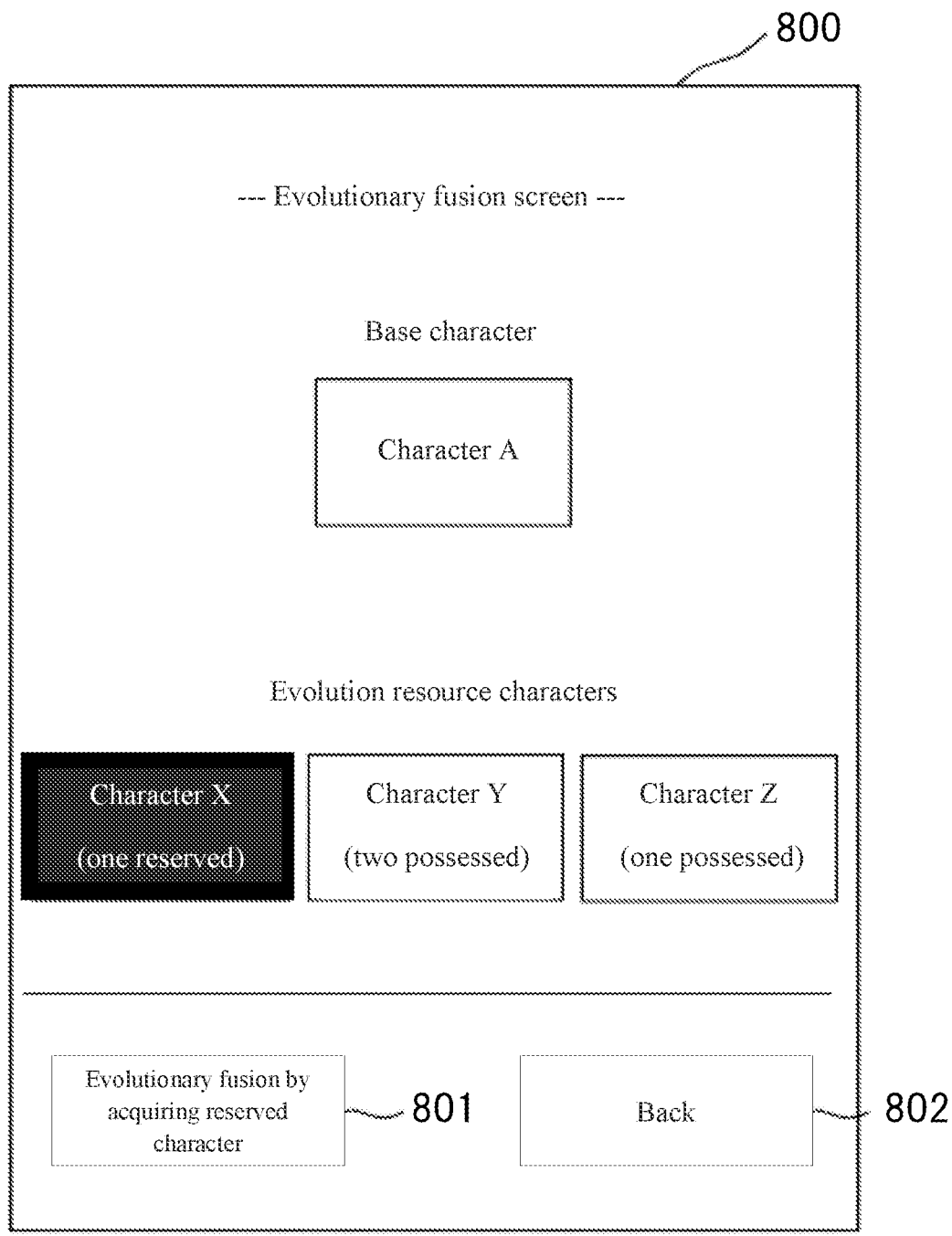
[FIG. 16]

VIDEO GAME FUSION CONTENT

CROSS-REFERENCE TO RELATED APPLICATIONS

The present application is a divisional of application Ser. No. 16/755,422, filed on Jun. 23, 2020, which is a national stage entry of PCT/JP2018/034231, filed on Sep. 14, 2018, which is based upon and claims the benefit of priority from Japanese Patent Application No. 2017-198145, filed on Oct. 12, 2017. The disclosures of each of the referenced applications are incorporated herein in their entirety by reference.

BACKGROUND

Technical Field

The present invention relates to an information processing device and a game program (e.g., non-transitory computer readable medium having machine-executable instructions with which a computer having a storage and a hardware processor, for providing a service).

Related Art

There is a known information processing device that executes a game in which content (such as a character) is set as a reward (such as a login reward) to be acquired by a user.

With a game such as this, the user does not have to immediately acquire content as a reward, and sometimes the acquisition can be reserved. In this case, when the user performs an operation for acquiring reserved content, the user can own that content. Thus, owning acquired content allows the user to use that content in a game.

However, sometimes the user ended up leaving the reserved content behind, without acquiring it, thereby missing the opportunity to use the content in a game.

SUMMARY OF THE INVENTION

The present invention was conceived in light of this situation, and it is an object of the present invention to allow reserved content to be utilized at the proper time.

The main invention of the present invention for solving the above and other problems is an information processing device, comprising:

a trade information storage unit that stores trade information for each user in which trade-away content and trade-for content that the user wants to acquire in a trade are set in association with each other;

a user information storage unit that stores user information in which the content acquired by the user is set as possessed content, and acquirable content that has been reserved by the user without having been acquired is set as reserved content;

a selection unit that selects reserved content that is the same as the content that becomes the designated trade-for content and is not the same as the possessed content, from among the user's reserved content based on the user information, as a result of an operation performed by the user to designate the content that will be the trade-for content that the user wants to acquire in a trade; and a notification unit that notifies the user that the selected reserved content can be acquired without a trade.

Other features of the present invention will become apparent from the description of the detailed description of the invention and the accompanying drawings.

BRIEF DESCRIPTION OF DRAWINGS

FIG. 1 is a configuration diagram showing an example of an information processing system pertaining to an embodiment;

FIG. 2 is a hardware configuration diagram showing an example of a computer pertaining to this embodiment;

FIG. 3 is a functional block diagram showing an example of a server device pertaining to this embodiment;

FIG. 4 is a functional block diagram showing an example of a client terminal pertaining to this embodiment;

FIG. 5 is a flowchart illustrating an operation example (specific example 1) related to a trade game for the information processing system 1 in this embodiment;

FIG. 6 is a configuration diagram showing an example of user information;

FIG. 7 is a configuration diagram showing an example of character information;

FIG. 8 is a simulation diagram showing an example of a notification screen;

FIG. 9 is a configuration diagram showing an example of trade setting information;

FIG. 10 is a configuration diagram showing an example of trade information;

FIG. 11 is a flowchart illustrating an operation example (specific example 2) related to a trade game for the information processing system 1 in this embodiment;

FIG. 12 is a simulation diagram showing an example of a trade invitation screen;

FIG. 13 is a flowchart illustrating an operation example (specific example 1) related to a fusion game for the information processing system 1 in this embodiment;

FIG. 14 is a simulation diagram showing an example of a notification screen;

FIG. 15 is a flowchart illustrating an operation example (specific example 2) related to a fusion game for the information processing system 1 in this embodiment; and FIG. 16 is a simulation diagram showing an example of an evolutionary fusion screen.

DETAILED DESCRIPTION OF THE INVENTION

At least the following will become apparent from the detailed description of the invention and the accompanying drawings.

Specifically, the present invention is an information processing device, comprising: a trade information storage unit that stores trade information for each user in which trade-away content and trade-for content that the user wants to acquire in a trade are set in association with each other;

a user information storage unit that stores user information in which the content acquired by the user is set as possessed content, and acquirable content that has been reserved by the user without having been acquired is set as reserved content;

a selection unit that selects reserved content that is the same as the content that becomes the designated trade-for content and is not the same as the possessed content, from among the user's reserved content based on the user information, as a result of an operation performed by the user to designate the content that will be the trade-for content the user wants to acquire in a trade; and a notification unit for notifying the user that the selected reserved content can be acquired without a trade.

With this information processing device, when the user designates trade-for content that the user wants to acquire in a trade, if there is a reserved content that is the same as this designated trade-for content, the user is notified that this content can be acquired without having to make a trade. Therefore, upon receiving this notification, the user can use the reserved content at the proper time even without being aware of which content he has reserved.

The present invention is also an information processing device, comprising:
- a trade information storage unit that stores trade information for each user in which trade-away content and trade-for content that the user wants to acquire in a trade are set in association with each other;
- a user information storage unit that stores user information in which the content acquired by the user is set as possessed content, and acquirable content that has been reserved by the user without having been acquired is set as reserved content;
- a selection unit that selects reserved content that is the same as the content that becomes the trade-for content that another user wants to acquire in a trade and is not the same as the possessed content, from among the user's reserved content based on the trade information and the user information, as a result of an operation performed by the user for browsing the content that will be the trade-for content that another user wants to acquire in a trade; and
- a notification unit that notifies the user that another user wants to acquire the selected reserved content in a trade.

With this information processing device, when the user browses trade-for content that another user wants to acquire in a trade, if there is reserved content that is the same as the trade-for content that another user wants to acquire in a trade, then the user is notified that another user wants to acquire that content in a trade. Therefore, upon receiving this notification, the user can use the reserved content at the proper time even without being aware of which content he has reserved.

The present invention is also an information processing device, comprising:
- a content information storage unit that stores content information in which a plurality of resource contents that are necessary for fusing content that will be a fusion source is set;
- a user information storage unit that stores user information in which the content acquired by the user is set as possessed content, and acquirable content that has been reserved by the user without having been acquired is set as reserved content;
- a selection unit that specifies resource content that the user does not possess, from among the one or more resource contents that are necessary for fusing content that will be the designated fusion source, based on the content information and the user information, as a result of an operation performed by the user to designate the content that will be the fusion source from among the user's possessed content, and that selects reserved content that is the same as the specified resource content from among the user's reserved content; and
- a notification unit that notifies the user that the selected reserved content can be used for fusing content that will be the fusion source designated as the resource content.

With this information processing device, when the user designates the content that will be a fusion source, if there is reserved content that is the same as the resource content that is necessary for fusing content that will be this designated fusion source, the user is notified that this reserved content can be utilized as a fusion resource for content that will be a fusion source. Therefore, upon receiving this notification, the user can use the reserved content at the proper time even without being aware of which content he has reserved.

Also, this device preferably comprises a guide unit that guides the user to a reward receipt screen where the reserved content can be received as a reward when an operation for acquiring the selected reserved character is performed by the notified user This makes it easy for the notified user to receive the reserved character.

Also, A non-transitory computer-readable recording storage medium storing a program for causing a computer comprising a processor and a memory,
wherein said program causes the computer to function as:
- a trade information storage means for storing trade information for each user in which trade-away content and trade-for content that the user wants to acquire in a trade are set in association with each other;
- a user information storage means for storing user information in which the content acquired by the user is set as possessed content, and acquirable content that has been reserved by the user without having been acquired is set as reserved content;
- a selection means for selecting reserved content that is the same as the content that becomes the designated trade-for content and is not the same as the possessed content, from among the user's reserved content based on the user information, as a result of an operation performed by the user to designate the content that will be the trade-for content that the user wants to acquire in a trade; and
- a notification means for notifying the user that the selected reserved content can be acquired without a trade.

This program allows reserved content to be acquired at the proper time.

Also, A non-transitory computer-readable recording storage medium storing a program for causing a computer comprising a processor and a memory,
wherein said program causes the computer to function as:
- a trade information storage means for storing trade information in which trade-away content and trade-for content that the user wants to acquire in a trade are set in association with each other for each user;
- a user information storage means for storing user information in which the content acquired by the user is set as possessed content, and acquirable content that has been reserved by the user without having been acquired is set as reserved content;
- a selection means for selecting reserved content that is the same as the content that becomes the trade-for content that another user wants to acquire in a trade and is not the same as the possessed content, from among the user's reserved content based on the trade information and the user information, as a result of an operation performed by the user for browsing the content that will be the trade-for content that another user wants to acquire in a trade; and
- a notification means for notifying the user that another user wants to acquire the selected reserved content in a trade.

This program allows reserved content to be acquired at the proper time.

Also, A non-transitory computer-readable recording storage medium storing a program for causing a computer comprising a processor and a memory,
  wherein said program causes the computer to function as:
    a content information storage means for storing content information in which a plurality of resource contents that are necessary for fusing content that will be a fusion source is set;
    a user information storage means for storing user information in which the content acquired by the user is set as possessed content, and acquirable content that has been reserved by the user without having been acquired is set as reserved content;
    a selection means for specifying resource content that is not the same as the user's possessed content, from among the plurality of resource contents that are necessary for fusing content that will be the designated fusion source, based on the content information and the user information, as a result of an operation performed by the user to designate the content that will be the fusion source from among the user's possessed content, and for selecting reserved content that is the same as the specified resource content from among the user's reserved content; and
    a notification means for notifying the user that the selected reserved content can be used for fusing content that will become the fusion source designated as the resource content.

This program allows reserved content to be acquired at the proper time.

EMBODIMENTS

The information processing device, program, and information processing system pertaining to an embodiment of the present invention will now be described in detail. The present invention is broadly applicable to an information processing device, a program, an information processing system, etc., that employs a game that allows a user to acquire rewards (such as characters or the like).

System Configuration

FIG. 1 is a configuration diagram showing an example of the information processing system 1 pertaining to this embodiment. As shown in FIG. 1, in the information processing system 1 pertaining to this embodiment, one or more client terminals 10 and a server device 20 are connected via a network N.

The client terminal 10 is a terminal device such as a PC, a smartphone, a tablet, or the like operated by a user, or is a terminal device such as a dedicated game device for home or commercial use. The server device 20 manages and controls a game played by the user on the client terminal 10, performs billing processing within the game, and so forth. The network N is the Internet or the like, and includes a mobile wireless base station and the like.

The present invention can be applied to a client/server type of information processing system 1 as shown in FIG. 1, as well as to a single game device by additionally providing some way to perform billing processing within the game. It should go without saying that the information processing system 1 in FIG. 1 is just an example, and that various system configurations are possible depending on the application and purpose. For instance, the server device 20 in FIG. 1 may be configured to be distributed among a plurality of computers.

Hardware Configuration
Client Terminal and Server Device

FIG. 2 is a hardware configuration diagram showing an example of the computer 50 pertaining to this embodiment. The client terminals 10 and the server device 20 pertaining to this embodiment are realized by the computer 50 having the hardware configuration shown in FIG. 2, for example. The computer 50 is an example of an information processing device comprising a processor and a memory.

As shown in FIG. 2, the computer 50 comprises a CPU 51, a RAM 52, a ROM 53, a communication interface 54, an input device 55, a display device 56, an external interface 57, an HDD 58, and the like, which are coupled to one another via a bus line B. The input device 55 and the display device 56 may be configured so that they are connected and used only when necessary.

The CPU 51 is an arithmetic apparatus that reads programs and data from a storage device such as the ROM 53 and the HDD 58 to the RAM 52, and executes various kinds of processing based on the read program and data, so as to realize the control and functions of the entire computer.

The RAM 52 is an example of a volatile semiconductor memory (storage device) for temporarily holding programs and data, and is also used as a work area when the CPU 51 executes various processing.

The ROM 53 is an example of a nonvolatile semiconductor memory (storage device) that can hold programs and data even when the power is switched off. The ROM 53 stores programs and data such as network settings, OS settings and BIOS that are executed when the computer 50 is started up.

The communication interface 54 is an interface for connecting the computer 50 to the network N. This allows the computer 50 to perform data communication via the communication interface 54.

The input device 55 is a device used by a user or an administrator to input various signals. The input device 55 is, for example, a touch panel, operation keys or buttons, a keyboard or a mouse, or another such operation device.

The display device 56 is a device for displaying various kinds of information on the screen to a user or a manager. The display device 56 is, for example, a display such as liquid crystal or organic EL.

The external interface 57 is an interface for connecting so as to enable data communication with an external device. This allows the computer 50 to read from and/or write to a recording medium via the external interface 57. The external device is, for example, a recording medium such as a flexible disk, a CD, a DVD, an SD memory card, a USB memory, or the like.

The HDD 58 is an example of a nonvolatile storage device that stores programs and data. The programs and data that are stored include an OS, which is basic software for controlling the entire computer, and applications that provide various functions in the OS.

A drive device (such as a solid state drive: SSD) using a flash memory as a storage medium may be used instead of the HDD 58.

The client terminals 10 and the server device 20 pertaining to this embodiment can realize various kinds of processing (discussed below) by executing a program in the computer 50 having the hardware configuration described above.

Software Configuration
Server Device

FIG. 3 is a functional block diagram showing an example of the server device 20 pertaining to this embodiment. The server device 20 pertaining to this embodiment is realized by the functional blocks shown in FIG. 3, for example.

The server device 20 pertaining to this embodiment realizes a server controller 200, a server storage unit 220, and a server communication unit 240 by executing a program.

The server controller 200 has a function of executing processing related to various kinds of games. The server controller 200 includes a game progression unit 201, an acquisition unit 202, a disposal unit 203, a notification unit 204, a display controller 205, a selection unit 206, and a guidance unit 207.

The game progression unit 201 controls the progress of various games (discussed below), such as a battle game, a lottery game, a fusion game, a selling game, and a trading game, based on game operations received by a client terminal 10.

The acquisition unit 202 allows a user to acquire content (such as a character) by setting the content of the user in user information that is associated with that user. For example, when the user performs an operation for acquiring a reserved character, the reserved character is set in the user information thereby allowing the user to acquire it.

The disposal unit 203 disposes of content (such as a character) possessed by a user by canceling the setting of that content from the user information associated with the user. For instance, when the user performs an operation for disposing of a character he possesses, the user's possessed character is disposed of by canceling the setting from the user information.

The notification unit 204 issues notifications for various kinds of information that a user needs in various kinds of games. For instance, the user is notified that a character or the like can be acquired as a login reward or a clearing reward. Also, for example, when the user performs an operation to designate a trade-for character that the user wants to acquire in a trade, the user is notified that a reserved character that is the same as the designated trade-for character can be acquired without making a trade. Notification to the user by the notification unit 204 is performed by screen display, email transmission, push notification, or the like.

The display controller 205 controls the screen display of the client terminal 10 by causing the game progression unit 201 to generate data for various kinds of screens according to the progress of a battle game, a lottery game, a fusion game, a selling game, a trading game, or the like, for example.

The selection unit 206 selects one of a plurality of contents (such as a character) based on various kinds of information in response to a user operation. For example, when the user performs an operation to designate a trade-for character that the user wants to acquire in a trade, a character that is the same as the designated trade-for character is selected from among the user's reserved characters.

The guidance unit 207 guides the user to a game screen where reserved content (such as a character) can be easily acquired. For example, when the user performs an operation for acquiring a reserved character, the user is guided to a reward receipt screen where that reserved character can be received as a reward.

The server storage unit 220 has a function of storing information related to various kinds of games. The server storage unit 220 includes a character information storage unit 221, a user information storage unit 222, a quest information storage unit 223, a lottery game information storage unit 224, a trade information storage unit 225, login reward information storage unit 226, and clearing reward information storage unit 227.

The character information storage unit 221 is an example of a content information storage unit and stores character information (content information) related to characters, which is an example of content. The character information stored in the character information storage unit 221 includes various characters used in battle games, lottery games, fusion games, selling games, trading games, and the like.

The user information storage unit 222 stores user information related to users. The user information stored in the user information storage unit 222 includes various kinds of characters possessed by a user (possessed characters), various kinds of characters reserved by a user (reserved characters), and the like.

The quest information storage unit 223 stores quest information related to quests. The quest information stored in the quest information storage unit 223 includes various kinds of characters that can be acquired in a quest, the number of points consumed to start a quest, and the like.

The lottery game information storage unit 224 stores lottery game information related to lottery games. The lottery game information stored in the lottery game information storage unit 224 includes various kinds of characters that can be acquired in a lottery game, and so forth.

The trade information storage unit 225 stores trade information related to trades performed between users. The trade information stored in the trade information storage unit 225 includes characters that each user wants to acquire in a trade, and so forth.

The login reward information storage unit 226 stores login reward information related to login rewards. In the login reward information stored in the login reward information storage unit 226, the type and quantity of login rewards (login bonuses) that can be acquired when a user logs in are set at regular intervals.

The clearing reward information storage unit 227 stores clearing reward information related to clearing rewards. The clearing reward information stored in the clearing reward information storage unit 227 includes the type and quantity of clearing rewards that can be acquired when a user satisfies clearing conditions for a quest or a mission.

The server communication unit 240 has a function of communicating with the client terminal 10 via the network N.

Client Terminal

FIG. 4 is a functional block diagram showing an example of a client terminal 10 pertaining to this embodiment. The client terminal 10 pertaining to this embodiment is realized by the functional blocks shown in FIG. 4, for example.

The client terminal 10 pertaining to this embodiment executes a program to realize a client controller 100, a client storage unit 120, a client communication unit 140, an operation receiver 150, and a screen display unit 160. The client controller 100 includes a request transmitter 101 and a response receiver 102.

The operation receiver 150 receives an operation from the user operating the client terminal 10. Also, the client controller 100 performs game-related processing on the client terminal 10. The request transmitter 101 transmits a request to the server device 20 based on the operation received by the operation receiver 150 from the user. The response receiver 102 receives a response, such as a processing result, to the request transmitted by the request transmitter 101 to the server device 20.

The client storage unit 120 stores various kinds of information required in the client terminal 10. The client communication unit 140 communicates with the server device

20. The screen display unit 160 displays the screen of the client terminal 10 according to the control of the server 20.

As described above, with the information processing system 1 pertaining to this embodiment, the server device 20 controls the progress and display of the game, but this control may instead be performed by the client terminal 10. More specifically, the configuration may be such that the game progression unit and/or the display controller is not provided to the server controller 200 of the server device 20, and is instead provided to the client controller 100 of the client terminal 10.

Also, the client controller 100 of the client terminal 10 may be a browser type that receives page data written in HTML (Hyper Text Markup Language) or the like, scripts included in the page data, and the like from the server device 20, and performs processing relating to the game. The client controller 100 of the client terminal 10 may also be an application type that performs processing relating to the game based on an installed application.

Game Overview

An overview of the games in this embodiment will now be given. The games in this embodiment include battle games, lottery games, fusion games, selling games, trading games, and the like.

Character Acquisition and Disposal

The battle game in this embodiment is a game in which an enemy character faces off against a party composed of a plurality of characters, and this enemy character battles the characters constituting the party. The user can form a party using his own possessed characters, etc., select one of the quests, and challenge the enemy character in a battle. In this battle game, a plurality of quests and missions are set according to the degree of difficulty. The user can acquire a clearing reward (such as a character or the like) by satisfying the clearing conditions of the quest or mission.

The lottery game in this embodiment is a game in which, when an operation for drawing a character is received from the user, a character is randomly selected from a group of characters targeted for selection based on lottery conditions. The user can acquire the character that is determined by this drawing.

The fusion game in this embodiment is a game in which, when an operation for fusing a character is received from the user, a character that is a fusion resource (resource character) is combined with a character that is a fusion source (base character), thereby strengthening the ability of the base character (strengthening fusion), or growing the base character to the next stage so that it evolves into the character (evolved character) to be fused (evolutionary fusion).

The user selects a base character and a resource character from among the characters possessed by the user, and performs game play of strengthening fusion or evolutionary fusion. With strengthening fusion, instead of disposing of the user's resource character, the user can improve the ability parameters of the base characters he continues to possess, or add new skills. With evolutionary fusion, all of the resource characters that have been associated with a base character are fused with that base character, allowing the user to acquire an evolved character that has grown from the base character, rather than disposing of all the resource characters.

The selling game in this embodiment is a game in which, when an operation for selling a character is received from the user, an unneeded character designated from among the characters possessed by the user is sold. When the user selects an unneeded character (sale character) from among the characters possessed by the user, the user can obtain a game coin, instead of disposing of the selected sale character.

The trading game in this embodiment is a game in which, when an operation for executing a character trade is received from the user, an unneeded character designated from among the characters possessed by the user is traded for a character that is possessed by another person and that the user wants to acquire. When the user selects an unneeded character (trade-away character) from among the characters possessed by the user, a character possessed by another user (trade-for character) can be acquired, instead of disposing of the selected trade-away character.

In this embodiment, the user can acquire a character or the like as a login reward by logging in to the game.

Character Reservation

In the game in this embodiment, a character acquired as a clearing reward or a login reward does not have to be acquired right away, and this acquisition can instead be reserved for later. That character can be then possessed by the user by performing an operation for acquiring the reserved character. Thus, possessing an acquired character allows the user to use the character in a trading game, a fusion game, or the like.

However, the user may sometimes forget which characters have been reserved, and end up leaving reserved characters behind without acquiring them. If this happens, despite the fact that a reserved character can be acquired without having to trade for it, the user may not realize this, and may set it as a trade-for character that he wants to acquire in a trade. Furthermore, even though the user could acquire a reserved character and then hand it over to another user in a trade, he may not realize this, and may go to the trouble of searching among the characters he possesses for another user's trade-for character in order to make a trade. Furthermore, even though the user could acquire a reserved character and utilize it as a fusion resource for a character he possesses, he may not realize this, and may end up repeatedly playing a battle game or a lottery game with the intent of acquiring that character.

In view of this, in this embodiment, when the user is playing a trading game, a fusion game, or the like, he is notified that a reserved character can be used in the game. Therefore, the user will not miss the opportunity to use a reserved character in a game, and can therefore acquire and use a reserved character at the proper time.

Operation

Trading Game

Specific Example 1

FIG. 5 is a flowchart illustrating an operation example (specific example 1) related to a trading game for the information processing system 1 in this embodiment. A case in which a character is reserved as a reward without being acquired will be described below.

The user performs an operation for trade setting on the client terminal 10 when the menu screen is displayed on the screen display unit 160 of the client terminal 10. When the user performs this operation, the operation receiver 150 of the client terminal 10 receives the operation details based on the user's game operation. The request transmitter 101 of the client terminal 10 makes a request to the server device 20 based on the operation details received by the operation receiver 150 from the user. The game progression unit 201 of the server device 20 receives the operation details for making trade settings from the client terminal 10, and requests the display controller 205 to execute screen display control so that the trade setting screen is displayed on the client terminal 10 (step S11).

More specifically, when the display controller 205 of the server device 20 is requested by the game progression unit 201 to execute screen display control, the possessed characters of that user are obtained from the user information stored in the user information storage unit 222, and various characters are obtained from the character information stored in the character information storage unit 221. After this, the display controller 205 of the server device 20 performs control so that the screen display unit 160 of the client terminal 10 displays the trade setting screen in which the user's possessed characters and various characters that can be acquired in a trade are displayed in a list.

FIG. 6 is a configuration diagram showing an example of user information. This user information includes categories such as user ID, name, rank, possessed characters, possessed number/upper limit number, reserved characters, possessed points, possessed coins, party, received email information, trade setting information, and so forth. "User ID" is information for uniquely identifying a user. "Name" is information indicating the user name. "Rank" is information indicating the user's game level. "Possessed characters" is information indicating one or more of the various characters possessed by the user. Here, the number of possessed characters is also set, as shown in parentheses in the drawing. The current ability parameters of the possessed characters, the level, and so forth are also set. "Possessed number" is information indicating the total number of characters that the user possesses, and "upper limit number" is information indicating the maximum number of characters that the user can possess. Here, the upper limit number is set to increase according to the rank of the user. "Reserved characters" is information indicating one or more of the acquirable characters that the user has reserved without acquiring. Here, the number of possessed characters is also set, as shown in parentheses in the drawing. "Possessed points" is information indicating the quantity of game points possessed by the user. "Possessed coins" is information indicating the quantity of game coins possessed by the user. "Party" is information indicating the characters that make up a party used by the user in a battle game. "Received email information" is information about emails received by the user from the system side. Here, the date and time of reception, the email content, whether or not an email has been opened, and other such information is included. In this embodiment, the system notifies the user by email that a character or the like can be acquired as a login reward or a clearing reward. "Trade setting information" is information about a user's trades.

FIG. 7 is a configuration diagram showing an example of character information. This character information includes categories such as character ID, name, rarity, ability parameters, number of coins, evolved characters, resource characters, and so forth. "Character ID" is information for uniquely identifying various characters, including base characters and resource characters. "Name" is information indicating the character name. "Rarity" is information indicating the rarity value of a character. This is set to one of a plurality of stages (such as five stages) of rarity. "Ability parameters" is information indicating the ability of characters. Here, ability values such as attack, defense, and HP are set. "Number of coins" is information indicating the number of coins corresponding to the value of a character. "Evolved characters" is information indicating evolved characters that are to be fused when evolutionary fusion is performed. It is also possible to set two or more types of evolved characters for a single character. "Resource characters" is information indicating characters that are fusion resources that have been associated with a character that is a fusion source. A resource character is a character that will be needed for the evolutionary fusion of a base character.

Going back to FIG. 5, the user then performs an operation on the client terminal 10 to designate a trade-away character when his own possessed characters are displayed as a list on the trade setting screen of the client terminal 10. When the user performs an operation to designate a trade-away character, the operation receiver 150 of the client terminal 10 receives the operation details based on the user's character designation (step S12).

Next, when a list of various characters that can be acquired in a trade is displayed on the trade setting screen of the client terminal 10, the user performs an operation on the client terminal 10 to designate the trade-for character that the user wants to acquire in a trade. When the user performs an operation to designate a trade-for character, the operation receiver 150 of the client terminal 10 receives the operation details based on the user's character designation (step S13).

Then, the request transmitter 101 of the client terminal 10 makes a request to the server device 20 based on the operation details received by the operation receiver 150 from the user. Upon receiving the operation details from the client terminal 10, the game progression unit 201 of the server device 20 requests the selection unit 206 to execute character selection processing. Then, upon receiving a request from the game progression unit 201 to execute character selection processing, the selection unit 206 of the server device 20 obtains the user's reserved characters from the user information stored in the user information storage unit 222. Then, an attempt is made to select a reserved character that is the same as the designated trade-for character from among the user's reserved characters thus obtained (step S14).

Next, the game progression unit 201 of the server device 20 determines whether or not the selection unit 206 has successfully selected a reserved character that is the same as the designated trade-for character (step S15).

If the result of this determination is that a reserved character that is the same as the trade-for character could not be selected (No in step S15), the processing proceeds to step S22 (discussed below). On the other hand, if a reserved character that is the same as the trade-for character was successfully selected (Yes in step S15), the processing proceeds to the next step S16.

Next, if a reserved character that is the same as the trade-for character was successfully selected, the game progression unit 201 of the server device 20 requests the selection unit 206 to execute character selection processing. Then, when the game progression unit 201 requests to execute character selection processing, the selection unit 206 of the server device 20 obtains the user's possessed characters from the user information stored in the user information storage unit 222. Then, an attempt is made to select a possessed character that is the same as the reserved character previously selected, from among the user's possessed characters thus obtained (step S16).

Next, the game progression unit 201 of the server device 20 determines whether or not the selection unit 206 has successfully selected a possessed character that is the same as the reserved character that was previously selected (step S17).

If the result of this determination is that a possessed character that is the same as the previously selected reserved character was successfully selected (Yes in step S17), the processing proceeds to step S22 (discussed below). On the other hand, if a possessed character that is the same as the previously selected reserved character could not be selected (No in step S17), the processing proceeds to the next step S18.

Next, if the selection unit 206 is unable to select a possessed character that is the same as the reserved character previously selected, the game progression unit 201 of the server device 20 requests the notification unit 204 to execute of notification processing for trade setting. When the notification unit 204 of the server device 20 is requested by the game progress unit 201 to execute notification processing, the notification unit 204 notifies the user via a notification screen that the selected reserved character can be acquired without making a trade (step S18).

The notification unit 204 in this embodiment requests the display controller 205 to execute screen display control as a result of the selection by the selection unit 206 of a reserved character that is the same as the trade-for character and is not the same as a possessed character. Upon receiving a request from the notification unit 204 to execute screen display control, the display controller 205 performs control to make the screen display unit 160 of the client terminal 10 display a notification screen for notifying the user that the selected reserved character can be acquired without making a trade.

FIG. 8 is a simulation diagram showing an example of the notification screen. The notification screen 500 shown in FIG. 8 displays that a character that is the same as the trade-for character designated by the user is currently being reserved, and that this reserved character can be acquired. There are also an operation button 501 for acquiring the reserved character and an operation button 502 for continuing to reserve the reserved character without acquiring it.

A user who does not want to acquire the reserved character performs a game operation of selecting the operation button 502 on the client terminal 10 when the notification screen 500 is being displayed on the screen display unit 160 of the client terminal 10.

A user who wants to acquire the reserved character performs a game operation of selecting the operation button 501 on the client terminal 10 when the notification screen 500 is being displayed on the screen display unit 160 of the client terminal 10.

The operation receiver 150 of the client terminal 10 receives an operation from the user for acquiring this reserved character, or an operation for not acquiring this reserved character. The request transmitter 101 of the client terminal 10 makes a request to the server device 20 based on the operation details received by the operation receiver 150 from the user.

Going back to FIG. 5, the guidance unit 207 of the server device 20 then receives the operation details from the client terminal 10 and determines whether or not an operation for acquiring that reserved character has been received (step S19).

If the result of this determination is that no operation for acquiring the reserved character has been received (No in step S19), the processing proceeds to step S22 (discussed below). On the other hand, if an operation for acquiring the reserved character has been received (Yes in step S19), the processing proceeds to the next step S20.

Next, if an operation for acquiring the reserved character has been received, the guidance unit 207 of the server device 20 executes guidance processing for guiding the user, who has been notified to this effect, to the reward acquisition screen (step S20).

More specifically, the guidance unit 207 of the server device 20 requests the display controller 205 to execute screen display control so that the reward acquisition screen is displayed on the client terminal 10. Then, upon receiving a request to execute screen display control from the guidance unit 207, the display controller 205 performs control to cause the screen display unit 160 of the client terminal 10 to display a reward acquisition screen for acquiring as a reward a reserved character that is the same as the trade-for character and is not the same as a possessed character.

The user performs a game operation on the client terminal 10 to acquire the reserved character when the reward acquisition screen is displayed on the screen display unit 160 of the client terminal 10. The operation receiver 150 of the client terminal 10 receives an operation for acquiring a reserved character. The request transmitter 101 of the client terminal 10 makes a request to the server device 20 based on the operation details received by the operation receiver 150 from the user.

Next, upon receiving a game operation from the user for requesting the acquisition of the reserved character, the game progression unit 201 of the server device 20 requests the acquisition unit 202 to execute acquisition processing. Upon receiving a request to execute acquisition processing from the game progression unit 201, the acquisition unit 202 of the server device 20 executes acquisition processing for that reserved character (step S21).

The acquisition unit 202 in this embodiment refers to the user information stored in the user information storage unit 222 and specifies the user information for that user. Then, the acquisition unit 202 cancels the setting as a reserved character for that specified user information, and changes the setting to a possessed character in the specified user information, so that the reserved character that is the reward can be acquired by the user.

Next, if a reserved character that is the same as the trade-for character could not be selected (No in step S15), and if a possessed character that is the same as the previously selected reserved character has been successfully selected (Yes in step S17), and if no operation has been received for acquiring that reserved character (No in step S19), then the game progression unit 201 of the server device 20 executes trade setting processing (step S22).

More specifically, the game progression unit 201 of the server device 20 makes trade settings that allow the trade-for character designated by the user to be acquired in a trade, and that allow the trade-away character designated by the user to be acquired by another user in a trade.

At this point, the game progression unit 201 of the server device 20 requests the disposal unit 203 to perform processing for releasing the trade-away character according to the trade setting. Upon receiving the request from the game progress unit 201, the disposal unit 203 of the server device 20 executes the disposal of that trade-away character.

The disposal unit 203 in this embodiment refers to the user information stored in the user information storage unit 222 and specifies the user information for that user. Then, the disposal unit 203 disposes of the trade-away character by canceling its setting as a possessed character in the specified user information.

The game progression unit 201 in this embodiment refers to the user information stored in the user information storage unit 222 and specifies the user information for that user. Then, the game progression unit 201 updates the trade setting information set in the specified user information, and also updates the trade information stored in the trade information storage unit 225, so that the settings are associated with the trade-away characters and trade-for characters designated by that user.

FIG. 9 is a configuration diagram showing an example of the trade setting information. This trade setting information includes categories such as setting frame, trade-away characters, trade-for characters, and so forth. "Setting frame" is information for specifying the individual setting frames in which characters to be traded can be set. Here, five setting frames are provided, so a maximum of five characters to be traded can be set. "Trade-away characters" is information indicating characters to be handed over to other users (that is, unwanted characters that the user wants to dispose of). "Trade-for characters" is information indicating characters that the user wants to receive from other users (that is, characters that the user wants to acquire).

FIG. 10 is a configuration diagram showing an example of trade information. This trade information includes categories such as trade ID, inviting users, trade-for characters, trade-away characters, trade permitted period, and so forth. "Trade ID" is information for uniquely identifying each trade. "Inviting users" is information indicating users who are inviting other users who are capable of making a trade between his own trade-away characters and the trade-for characters of the other user. "Trade-away characters" is information indicating trade-away characters that inviting users plan to release. "Trade-for characters" is information indicating trade-for characters wanted by inviting users. "Trade permitted period" is information indicating the period during which trades can be made between users.

When the user thus designates a trade-for character that he wants to acquire in a trade, the user is notified that a reserved character that is the same as the designated trade-for character and is not the same as a possessed character can be acquired without making a trade. Therefore, upon receiving this notification, the user can acquire the reserved content at the proper time even without being aware of which content he has reserved.

Specific Example 2

FIG. 11 is a flowchart illustrating an operation example (specific example 2) related to a trade game in the information processing system 1 in this embodiment. A case in which a character that is a reward is reserved without being acquired will be described below.

The user performs an operation on the client terminal 10 for browsing the trade invitation screen when the menu screen is being displayed on the screen display unit 160 of the client terminal 10. When the user performs this operation, the operation receiver 150 of the client terminal 10 receives the operation details based on the user's browsing operation (step S31).

The request transmitter 101 of the client terminal 10 makes a request to the server device 20 based on the operation details received by the operation receiver 150 from the user. Upon receiving the operation details from the client terminal 10, the game progression unit 201 of the server device 20 requests the selection unit 206 to execute character selection processing. Then, upon receiving a request to execute character selection processing from the game progress unit 201, the selection unit 206 of the server device 20 obtains a reserved character of that user from the user information stored in the user information storage unit 222, and obtains a trade-for character that an inviting user (other user) wants to acquire, from the trade information stored in the trade information storage unit 225. Then, an attempt is made to select a reserved character that is the same as the trade-for character that the inviting user wants to acquire in a trade, from among the user's reserved characters thus obtained (step S32).

Next, the game progression unit 201 of the server device 20 determines whether or not the selection unit 206 has successfully selected a reserved character that is the same as the trade-for character of the inviting user (step S33).

If the result of this determination is that a reserved character that is the same as the trade-for character of the inviting user could not be selected (No in step S33), the processing proceeds to step S37 (discussed below). On the other hand, if a reserved character that is the same as the trade-for character of the inviting user has been successfully selected (Yes in step S33), the processing proceeds to the next step S34.

Next, if a reserved character that is the same as the trade-for character of the inviting user has been successfully selected, the game progression unit 201 of the server device 20 requests the selection unit 206 to execute character selection processing. Then, upon receiving a request to execute character selection processing from the game progression unit 201, the selection unit 206 of the server device 20 obtains the possessed character of that user from the user information stored in the user information storage unit 222. Then, an attempt is made to select a possessed character that is the same as the reserved character previously selected from among the user's possessed characters thus obtained (step S34).

Next, the game progression unit 201 of the server device 20 determines whether or not the selection unit 206 has successfully selected a possessed character that is the same as the reserved character that was previously selected (step S35).

If the result of this determination is that a possessed character that is the same as the previously selected reserved character has been successfully selected (Yes in step S35), the processing proceeds to step S37 (discussed below). On the other hand, if a possessed character that is the same as the previously selected reserved character could not be selected (No in step S35), the processing proceeds to the next step S36.

Next, if selection unit 206 could not select a possessed character that is the same as the reserved character previously selected, the game progression unit 201 of the server device 20 requests the notification unit 204 to execute notification processing for browsing the trade invitation screen. Upon receiving a request to execute this notification processing from the game progression unit 201, the notification unit 204 of the server device 20 notifies the user via the trade invitation screen that an inviting user wants to acquire the selected reserved character in a trade (step S36).

When a reserved character that is the same as the trade-for character of the inviting user and is not the same as a possessed character is thus selected by the selection unit 206, the notification unit 204 in this embodiment requests the display controller 205 to change the trade invitation screen to a mode of displaying the trade-for character of an inviting user that is the same as the selected reserved character, thereby notifying the user that an inviting user wants to acquire the selected reserved character in a trade.

Next, the game progression unit 201 of the server device 20 requests the display controller 205 to execute screen display control so that the trade invitation screen is displayed on the client terminal 10. Upon receiving a request to execute screen display control from the game progression unit 201, the display controller 205 of the server device 20 performs control to display the trade invitation screen on the screen display unit 160 of the client terminal 10 (step S37).

More specifically, the display controller 205 of the server device 20 performs control to cause the screen display unit 160 of the client terminal 10 to display the trade invitation screen in which the trade-away characters of the inviting user and the trade-for characters that the inviting user wants to acquire are associated with each other and displayed in a list, based on the trade information stored in the trade information storage unit 225. Here, if there is a request from the notification unit 204, the display controller 205 changes the display mode of the trade-for character of the inviting user that is the same as the reserved character selected in the processing of step S32 as described above.

FIG. 12 is a simulation diagram showing an example of the trade invitation screen. An inviting user list 601 is displayed on the trade invitation screen 600 shown in FIG. 12. The inviting user list 601 displays a list in which trade-away characters and trade-for characters of the inviting user are associated with each other. Here, since "character X," which is the trade-for character of "inviting user 1," is the same as the reserved character of the user who is browsing the trade invitation screen 600, the display mode of that "character X" is changed (highlighted in the display). Here, for example, when an operation to acquire the "character X" whose display mode has been changed is received from the user, the guidance unit 207 of the server device 20 allows the user to acquire the "character X" that is reserved, and the game progression unit 201 may also execute a trade between "character X" and "character K" owned by the inviting user. Furthermore, the "character X" acquisition (guidance) and the trade may be performed together. In addition to this, the number of "characters X" reserved by the user and the number of "characters X" possessed by the user may be displayed near the "character X" that is the trade-for character, and the game progression unit 201 may allow the user to select whether to trade a "character X" that he has reserved, or to trade a "character X" that he possesses.

Thus, when the user performs an operation to browse the trade invitation screen, if there is a reserved character that is the same as the trade-for character that an inviting user (another user) wants to acquire in a trade, then a notification is given that this inviting user wants to acquire that reserved character in a trade. Therefore, upon receiving this notification, the user can easily and without extra effort acquire a reserved character and use it in a trade game at the proper time without even being aware of which characters he has reserved.

Fusion Game

Specific Example 1

FIG. 13 is a flowchart illustrating an operation example (specific example 1) related to a fusion game for the information processing system 1 in this embodiment. A case in which a character is reserved as a reward, without being acquired, will be described below.

The user performs an operation for evolutionary fusion on the client terminal 10 when the menu screen is displayed on the screen display unit 160 of the client terminal 10. When the user performs this operation, the operation receiver 150 of the client terminal 10 receives the operation details based on the user's game operation. The request transmitter 101 of the client terminal 10 makes a request to the server device 20 based on the operation details received by the operation receiver 150 from the user. The game progression unit 201 of the server device 20 receives the operation details for performing the evolutionary fusion from the client terminal 10, and requests the display controller 205 to execute screen display control so that the evolutionary fusion screen is displayed on the client terminal 10 (step S51).

More specifically, upon receiving a request to execute screen display control from the game progressing unit 201, the display controller 205 of the server device 20 obtains the possessed characters that can be evolved, from among the characters possessed by that user, from the user information stored in the user information storage unit 222. After this, the display controller 205 of the server device 20 performs control so that the screen display unit 160 of the client terminal 10 displays the evolutionary fusion screen in which the user's possessed characters that can be evolved are displayed in a list.

Next, the user performs an operation on the client terminal 10 to designate one of the base characters when the evolutionary fusion screen is displayed on the screen display unit 160 of the client terminal 10. When the user performs an operation to designate one of the base characters, the operation receiver 150 of the client terminal 10 receives the operation details based on the user's designation of the base character (step S52).

Then, the request transmitter 101 of the client terminal 10 makes a request to the server device 20 based on the operation details received by the operation receiver 150 from the user. Upon receiving the operation details from the client terminal 10, the game progress unit 201 of the server device 20 refers to the character information stored in the character information storage unit 221, specifies one or more resource characters associated with the base character designated by the user (that is, the resource character that is necessary for the evolutionary fusion of the base character), and specifies the evolved character to be fused, which is associated with the base character (step S53).

Next, when one or more resource characters associated with the base character designated by the user have been specified, the game progression unit 201 of the server device 20 refers to the possessed characters included in the user information stored in the user information storage unit 222, and compares the plurality of resource characters specified in the processing of step S53 (described above) with the user's possessed characters. Then, the game progression unit 201 of the server device 20 determines, based on the result of this comparison, whether or not the plurality of resource characters include any missing resource characters that the user does not yet possess (step S54).

That is, if this comparison reveals that the one or more resource characters do not match the user's possessed characters, the game progression unit 201 of the server device 20 can specify any missing resource characters that the user does not yet possess from among the plurality of resource characters.

If the result of this determination is that there are no missing resource characters that the user does not yet possess among the one or more resource characters (No in step S54), the processing proceeds to step S61 (discussed below). On the other hand, if it is determined that there is a missing resource character that the user does not yet possess among the one or more resource characters (Yes in step S54), the processing proceeds to the next step S55.

Next, if it is determined that there is a missing resource character, the game progression unit 201 of the server device 20 requests the selection unit 206 to execute character selection processing. Then, upon receiving a request to execute character selection processing from the game progression unit 201, the selection unit 206 of the server device 20 obtains the user's reserved characters from the user information stored in the user information storage unit 222. Then, an attempt is made to select a reserved character that is the same as the missing resource character from among the user's reserved characters thus obtained (step S55).

Next, the game progression unit 201 of the server device 20 determines whether or not the selection unit 206 has successfully selected a reserved character that is the same as the missing resource character (step S56).

If the result of this determination is that a reserved character that is the same as the missing resource character could not be selected (No in step S56), the processing returns to the above-mentioned step S52, and the user is made to designate another base character. On the other hand, if a reserved character that is the same as the missing resource character has been successfully selected (Yes in step S56), the processing proceeds to the next step S57.

Next, if the selection unit 206 has successfully selected a reserved character that is the same as the missing resource character, the game progression unit 201 of the server device 20 requests the notification unit 204 to execute notification processing for evolutionary fusion. Upon receiving a request to execute this notification processing from the game progression unit 201, the notification unit 204 of the server device 20 notifies the user via a notification screen that this selected reserved character can be used as a resource character in the evolutionary fusion of the designated base character (step S57).

The notification unit 204 in this embodiment requests the display controller 205 to execute screen display control as a result of this selection of a reserved character that is the same as the missing resource character by the selection unit 206. Upon receiving a request from the notification unit 204 to execute screen display control, the display controller 205 performs control to cause the screen display unit 160 of the client terminal 10 to display a notification screen for notifying the user that the selected reserved character can be used as a resource character for the evolutionary fusion of the designated base character.

FIG. 14 is a simulation diagram showing an example of the notification screen. The notification screen 700 shown in FIG. 14 displays that, of the one or more resource characters that are necessary for evolutionary fusion of the base character designated by the user, a character that is the same as a missing resource character is currently being reserved, and that this reserved character can be acquired. There are also an operation button 701 for acquiring the reserved character and an operation button 702 for continuing to reserve the reserved character without acquiring it.

A user who does not want to acquire a reserved character performs a game operation of selecting the operation button 702 on the client terminal 10 when the notification screen 700 is displayed on the screen display unit 160 of the client terminal 10.

A user who wants to acquire a reserved character performs a game operation of selecting the operation button 701 on the client terminal 10 when the notification screen 700 is displayed on the screen display unit 160 of the client terminal 10.

The operation receiver 150 of the client terminal 10 receives from the user an operation for acquiring the reserved character, or an operation for not acquiring the reserved character. The request transmitter 101 of the client terminal 10 makes a request to the server device 20 based on the operation details received by the operation receiver 150 from the user.

Going back to FIG. 13, the guidance unit 207 of the server device 20 then receives the operation details from the client terminal 10, and determines whether or not an operation for acquiring the reserved character has been received (step S58).

If the result of this determination is that no operation for acquiring a reserved character has been received (No in step S58), the processing returns to the above-mentioned step S52, and the user is made to designate another base character. On the other hand, if an operation for acquiring a reserved character has been received (Yes in step S58), the processing proceeds to the next step S59.

Next, when an operation for acquiring a reserved character has been received, the guidance unit 207 of the server device 20 executes guidance processing for guiding the user, who has been notified of this, to the reward acquisition screen (step S59).

More specifically, the guidance unit 207 of the server device 20 requests the display controller 205 to execute screen display control so that the reward acquisition screen is displayed on the client terminal 10. Upon receiving a request to execute screen display control from the guidance unit 207, the display controller 205 performs control to cause the screen display unit 160 of the client terminal 10 to display a reward acquisition screen for acquiring a reserved character that is the same as the missing resource character, as a reward.

The user performs a game operation on the client terminal 10 to acquire the reserved character when the reward acquisition screen is displayed on the screen display unit 160 of the client terminal 10. The operation receiver 150 of the client terminal 10 receives an operation for acquiring a reserved character. The request transmitter 101 of the client terminal 10 makes a request to the server device 20 based on the operation details received by the operation receiver 150 from the user.

Next, upon receiving a game operation from the user to request the acquisition of a reserved character, the game progression unit 201 of the server device 20 requests the acquisition unit 202 to execute acquisition processing. Upon receiving this request to execute acquisition processing from the game progression unit 201, the acquisition unit 202 of the server device 20 executes acquisition processing for that reserved character (step S60).

The acquisition unit 202 in this embodiment refers to the user information stored in the user information storage unit 222 and specifies the user information for that user. Then, the acquisition unit 202 cancels the setting as a reserved character for that specified user information, and changes the setting to a possessed character in the specified user information, so that the reserved character that is the reward can be acquired by the user.

Next, if it is determined that there is no missing resource character (No in step S54), the game progression unit 201 of the server device 20 determines whether or not a game operation has been received for performing evolutionary fusion of the designated base character (step S61).

Next, if a game operation for performing evolutionary fusion of the base character has been received from the user (Yes in step S61), the game progression unit 201 of the server device 20 executes evolutionary fusion processing of that base character (step S62).

More specifically, the game progression unit 201 of the server device 20 updates the possessed characters included in the user information stored in the user information storage unit 222, and adds a new evolved character associated with the base character as a user's possessed character.

Here, the game progression unit 201 of the server device 20 requests the disposal unit 203 to perform processing to release that base character and all of the resource characters associated with the base character by evolutionary fusion. Upon receiving a request from the game progression unit 201, the disposal unit 203 of the server device 20 executes the disposal of these characters.

The disposal unit 203 in this embodiment refers to the user information stored in the user information storage unit 222 and specifies the user information for that user. Then, the disposal unit 203 disposes of the base character and all of the resource characters associated with the base character by canceling its setting as a possessed character in the specified user information.

Thus, when the user designates a base character to be used in evolutionary fusion, from among the resource characters that are necessary for evolutionary fusion of the designated base character, any missing resource character that is not yet possessed is specified, and the user is notified that a reserved character that is the same as the missing resource character can be acquired. Therefore, upon receiving this notification, the user can easily and without extra effort acquire a reserved character and use it in a fusion game at the proper time without even being aware of which characters he has reserved.

Specific Example 2

FIG. 15 is a flowchart illustrating an operation example (specific example 2) related to a fusion game in the information processing system 1 in this embodiment.

The user performs an operation for evolutionary fusion on the client terminal 10 when a menu screen is displayed on the screen display unit 160 of the client terminal 10. When the user performs this operation, the operation receiver 150 of the client terminal 10 receives the operation details based on the user's game operation. The request transmitter 101 of the client terminal 10 makes a request to the server device 20 based on the operation details received by the operation receiver 150 from the user. The game progression unit 201 of the server device 20 receives the operation details for performing evolutionary fusion from the client terminal 10, and obtains the possessed characters that can be evolved, from among all the user's possessed characters, from the user information stored in the user information storage unit 222. After this, the display controller 205 of the server device 20 performs control so that the screen display unit 160 of the client terminal 10 displays an evolutionary fusion screen in which the user's evolvable characters are displayed in a list (step S71).

Next, the user performs an operation on the client terminal 10 to designate a base character from the evolvable possessed characters listed on the screen display unit 160 of the client terminal 10. When the user performs an operation to designate one of the base characters, the operation receiver 150 of the client terminal 10 receives the operation details based on the user's designation of the base character (step S72).

Then, the request transmitter 101 of the client terminal 10 makes a request to the server device 20 based on the operation details received by the operation receiver 150 from the user. Upon receiving the operation details from the client terminal 10, the game progress unit 201 of the server device 20 refers to the character information stored in the character information storage unit 221, and specifies one or more resource characters associated with the base character designated by the user (that is, the resource character that is necessary for the evolutionary fusion of the base character) (step S73).

Next, when one or more resource characters associated with the base character designated by the user have been specified, the game progression unit 201 of the server device 20 refers to the possessed characters included in the user information stored in the user information storage unit 222, and compares the one or more resource characters specified in the processing of step S73 described above with the user's possessed characters. The game progression unit 201 of the server device 20 then determines whether or not the user possesses all of these one or more resource characters based on the result of this comparison (step S74).

If the result of this determination is that the user possesses all of the one or more resource characters (Yes in step S74), the processing proceeds to step S81 (discussed below). On the other hand, if it is determined that the user does not possess all of the one or more resource characters (No in step S74), the processing proceeds to the next step S75.

Next, if it is determined that not all of the resource characters are possessed, the game progression unit 201 of the server device 20 requests the selection unit 206 to execute character selection processing. Then, upon receiving a request to execute character selection processing from the game progression unit 201, the selection unit 206 of the server device 20 obtains the user's reserved characters from the user information stored in the user information storage unit 222. Then, an attempt is made to select reserved characters that are the same as the missing resource characters from among the user's reserved characters thus obtained, and it is determined whether or not the missing resource characters are among the reserved characters (step S75).

If the result of this determination is that all of the missing resource characters can be selected from the reserved characters (Yes in step S75), the processing proceeds to step S77 (discussed below). On the other hand, if all of the missing resource characters cannot be selected from the reserved characters (No in step S75), the processing proceeds to the next step S76.

Next, if it is determined that not all of the missing resource characters can be selected from the reserved characters, the game progression unit 201 of the server device 20 requests the display controller 205 to generate a screen indicating that evolutionary fusion is impossible. Then, the display controller 205 of the server device 20 performs control so that the screen display unit 160 of the client terminal 10 displays a screen indicating that evolution cannot be performed because the user either does not possess or has not reserved at least one of the one or more resource characters associated with the base character designated by the user (step S76), and the processing ends.

Next, when it is determined that all of the missing resource characters have been successfully selected from the reserved characters, the game progression unit 201 of the server device 20 requests the display controller 205 to generate a screen indicating that reserved characters can be acquired and evolutionary fusion is possible. Then, the display controller 205 of the server device 20 displays an evolutionary fusion screen indicating that, of the base character designated by the user and the one or more resource characters associated with that base character, a character that is not possessed is reserved (evolutionary fusion is possible by acquiring a reserved character) (step S77).

FIG. 16 is a simulation diagram showing an example of an evolutionary fusion screen (that evolution is possible by acquiring a reserved character). On the evolutionary fusion screen 800 shown in FIG. 16, it is displayed that, among the one or more resource characters that are necessary for evolutionary fusion of the base character designated by the user, a character that is the same as the missing resource character is currently reserved. Here, since "character X," which is one of the resource characters, is not possessed and is reserved, the display mode of that "character X" has been changed (is highlighted). There are also an operation button 801 for performing evolutionary fusion while acquiring a reserved character (character X) and an operation button 802 for returning to the designation of the base character without performing evolutionary fusion.

A user who wants to perform evolutionary fusion while acquiring the reserved character (character X) performs a game operation on the client terminal 10 of selecting the operation button 801 when the evolutionary fusion screen 800 is displayed on the screen display unit 160 of the client terminal 10.

The operation receiver 150 of the client terminal 10 receives from the user an operation for performing evolutionary fusion while acquiring the reserved character, or an operation for returning to the designation of the base character. The request transmitter 101 of the client terminal 10 makes a request to the server device 20 based on the operation details received by the operation receiver 150 from the user.

On the evolutionary fusion screen 800, for example, when an operation of acquiring the "character X" (such as an operation of tapping the character X) whose display mode has been changed is received from the user, the guidance unit 207 of the server device 20 may allow the user to acquire (possess) the "character X" that is reserved, and then the display controller 205 of the server device 20 may be changed to indicate that the "character X" is currently possessed on the evolutionary fusion screen 800.

Going back to FIG. 15, next, the game progression unit 201 of the server device 20 receives from the client terminal 10 the operation details instructing that evolutionary fusion be performed while acquiring a reserved character (step S78).

Next, the guidance unit 207 of the server device 20 executes guide processing for acquiring (allowing the user to possess) a reserved character that is the same as a missing resource character (step S79).

More specifically, the game progression unit 201 of the server device 20 adds a new reserved character that is the same as the missing resource character to the possessed characters included in the user information stored in the user information storage unit 222.

Next, the game progression unit 201 of the server device 20 performs evolutionary fusion processing of the base character designated by the user (step S80), and ends the processing.

More specifically, the game progression unit 201 of the server device 20 updates the possessed characters included in the user information stored in the user information storage unit 222, and adds the evolved character associated with the base character as a new user's possessed character. Here, the game progression unit 201 deletes the base character and one or more resource characters that are necessary for evolutionary fusion of the base character from the possessed characters included in the user information stored in the user information storage unit 222.

Next, if it is determined that the user possesses all of the one or more resource characters, the game progression unit 201 of the server device 20 requests the display controller 205 to generate a screen indicating that evolutionary fusion is possible with a possessed character. Then, the display controller 205 of the server device 20 displays an evolutionary fusion screen indicating that the user possesses the base character designated by the user and one or more resource characters associated with that base character (evolutionary fusion is possible with a possessed character) (step S81).

Next, the game progression unit 201 of the server device 20 receives from the client terminal 10 the operation details instructing that evolutionary fusion be performed (step S82), and performs the above-mentioned evolutionary fusion processing (step S80).

Thus, when the user designates a base character to be used in evolutionary fusion, the user is shown on the evolutionary fusion screen that, from among the resource characters that are necessary for evolutionary fusion of the designated base character, any missing resource characters not yet possessed are specified, and that evolutionary fusion is possible while acquiring reserved characters that are the same as the missing resource characters. Therefore, the user can easily and without extra effort acquire the reserved characters and use them in a fusion game at the proper time without even being aware of which characters he has reserved.

Other Embodiments

The above embodiment is intended to facilitate an understanding of the present invention and should not be construed as limiting the present invention. The present invention can be modified and improved upon without departing from the spirit of the invention, and equivalents thereof are also included in the present invention. In particular, the embodiments described below are also encompassed by the present invention.

Acquisition of Reserved Characters

In the embodiment described above, it is also possible for the acquisition unit 202 to limit operation such that when the user has performed a game operation requesting the acquisition of a reserved character as a reward, that reserved character cannot be acquired by the user after the reservation period has reached a specific length of time (such as 100 days after receipt of an email, 100 days after the email was opened, or 100 days after acquisition became possible). This allows the user to acquire or dispose of reserved characters before the specific length of time has elapsed, so that reserved characters will be less likely to be left unclaimed.

Notification of Reserved Characters

In the above embodiment, if the reservation period of the character as a reward is set to a specific length of time (such as 100 days after receipt of an email, 100 days after the email was opened, or 100 days after acquisition became possible), it is also possible for the notification unit 204 to give priority in notification to reserved characters whose reservation period is ending sooner, when the selection unit 206 has selected a plurality of reserved characters that are the same as trade-for characters, or has selected a plurality of reserved characters that are the same as missing resource characters.

Disposal of Reserved Characters

In the above embodiment, when a user who has received this notification from the notification unit 204 performs an operation for receiving the reserved character, that reserved character may be disposed of, such as being used as a resource for evolutionary fusion, without first acquiring and possessing that reserved character. More specifically, on the notification screen 700 shown in FIG. 14, when the user selects the operation button 701 for receiving a reserved character, the game progression unit 201 uses the reserved character to evolve the base character, and the disposal unit 203 performs disposal by canceling the setting of that reserved character as a reserved character in the user information, without having the user first acquire that reserved character. Consequently, the reserved character can be disposed of without its first being possessed as a possessed character, so the reserved character can be disposed of efficiently.

Notification of Trades

In the above embodiment, when a user's reserved character has been set as a trade-away character in trade setting, it is also possible for the game progression unit 201 of the server device 20 to request the notification unit 204 to execute notification processing if that reserved character is set as a trade-for character that another user wants to acquire in a trade. Upon receiving a request to execute notification processing from the game progression unit 201, it is also possible for the notification unit 204 of the server device 20 to send an email to the user saying that another user wants to acquire that reserved character in a trade. This allows the user to easily dispose of a reserved character by handing it over to someone else.

Coin Consumption in Trading

In the above embodiment, it is also possible to consume a specific amount of coins from the coins possessed by the user when making a trade setting for a reserved character. Consequently, the user will not be able to set a reserved character for trade if he does not possess a sufficient number of coins, so excessive trading is suppressed.

Content

In the above embodiment, a character that is set as character information is described as an example of content, but the content is not limited to this. For example, the content may be an item, a card, a figure, an avatar, or the like.

The invention claimed is:

1. An information processing device, comprising:
   a content information storage unit that stores content information in which a plurality of resource contents that are necessary for fusing content that will be a designated fusion source is set;
   a user information storage unit that stores user information in which the content acquired by a user is set as possessed content, and acquirable content that has been reserved by the user without having been acquired is set as reserved content;
   a selection unit that specifies resource content that the user does not possess, from among the one or more resource contents that are necessary for fusing content that will be the designated fusion source, based on the content information and the user information, as a result of an operation performed by the user to designate the content that will be the fusion source from among the user's possessed content, and that selects reserved content that is the same as the specified resource content from among the user's reserved content; and
   a notification unit that notifies the user that the selected reserved content can be used for fusing content that will become the fusion source designated as the resource content.

2. A non-transitory computer-readable recording storage medium storing a program for causing a computer comprising a processor and a memory,
   wherein said program causes the computer to function as:
   a content information storage means for storing content information in which a plurality of resource contents that are necessary for fusing content that will be a designated fusion source is set;
   a user information storage means for storing user information in which the content acquired by a user is set as possessed content, and acquirable content that has been reserved by the user without having been acquired is set as reserved content;
   a selection means for specifying resource content that is not the same as the user's possessed content, from among the plurality of resource contents that are necessary for fusing content that will be the designated fusion source, based on the content information and the user information, as a result of an operation performed by the user to designate the content that will be the fusion source from among the user's possessed content, and for selecting reserved content that is the same as the specified resource content from among the user's reserved content; and
   a notification means for notifying the user that the selected reserved content can be used for fusing content that will become the fusion source designated as the resource content.

* * * * *